US008457230B2

(12) United States Patent
van Rooyen

(10) Patent No.: US 8,457,230 B2
(45) Date of Patent: Jun. 4, 2013

(54) RECONFIGURABLE ORTHOGONAL FREQUENCY DIVISION MULTIPLEXING (OFDM) CHIP SUPPORTING SINGLE WEIGHT DIVERSITY

(75) Inventor: Pieter van Rooyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1019 days.

(21) Appl. No.: 11/237,328

(22) Filed: Sep. 28, 2005

(65) Prior Publication Data

US 2007/0071126 A1   Mar. 29, 2007
US 2010/0080314 A9   Apr. 1, 2010

Related U.S. Application Data

(63) Continuation-in-part of application No. 10/645,349, filed on Aug. 21, 2003, now Pat. No. 7,148,845.

(60) Provisional application No. 60/405,285, filed on Aug. 21, 2002.

(51) Int. Cl.
*H04B 7/02* (2006.01)
*H04L 1/02* (2006.01)

(52) U.S. Cl.
USPC .......................................... 375/267; 704/242

(58) Field of Classification Search
USPC ..................... 375/267, 260, 259; 704/242
See application file for complete search history.

(56) References Cited

U.S. PATENT DOCUMENTS 6,249,250 B1 *  6/2001  Namekata et al. ............ 342/372
6,546,026 B1 *  4/2003  Goeddel ....................... 370/513
6,687,492 B1 *  2/2004  Sugar et al. .................. 455/276.1
7,269,202 B2 *  9/2007  Nakao et al. .................. 375/147
2002/0196734 A1 * 12/2002  Tanaka et al. ................. 370/210

(Continued)

FOREIGN PATENT DOCUMENTS

CN        1425225         6/2003
EP        1172956 A1 *    1/2002
WO    WO 2004/084447 A2   9/2004

OTHER PUBLICATIONS

Liang, Y-C., et al., "New Phase Adjustment and Channel Estimation Methods for RF Combining Applicable in Mobile Terminals," *Wireless Personal Communications* 25(3):186-204, Kluwer Academic Publishers, Netherlands (Jun. 2003) (18 pages).
European Search Report and Search Opinion for EP Application No. EP 06 01 1768, Berlin, Germany, mailed on Feb. 13, 2012.

*Primary Examiner* — Daniel Washburn
*Assistant Examiner* — Brian J Stevens
(74) *Attorney, Agent, or Firm* — Sterne, Kessler, Goldstein & Fox P.L.L.C.

(57) ABSTRACT

A method and system for a reconfigurable orthogonal frequency division multiplexing (OFDM) chip supporting single weight diversity are provided. The reconfigurable OFDM chip may be configured to process signals such as IEEE 802.11, 802.16, and digital video broadcasting (DVB). The OFDM chip may generate channel weights to be applied to signals received in receive antennas. The weighted signals may be combined into a single received signal and channel estimates may be generated from the single received signal. Updated channel weights may be generated from the generated channel estimates. Updates to the channel weights may be performed dynamically. The configurable OFDM chip may be utilized to provide collaborative cellular and OFDM-based communication. The reconfigurable OFDM chip and the cellular chip may communicate data and/or control information via a memory coupled to a common bus.

19 Claims, 13 Drawing Sheets

U.S. PATENT DOCUMENTS

| | | |
|---|---|---|
| 2003/0048800 A1* | 3/2003 | Kilfoyle et al. ............... 370/441 |
| 2003/0058787 A1* | 3/2003 | Vandenameele-Lepla ... 370/206 |
| 2003/0128751 A1* | 7/2003 | Vandenameele-Lepla ... 375/229 |
| 2004/0104844 A1* | 6/2004 | Rooyen et al. ................ 342/377 |
| 2004/0162021 A1* | 8/2004 | Seki et al. ........................ 455/39 |
| 2005/0184906 A1* | 8/2005 | Nakaya et al. ................. 342/377 |
| 2005/0243791 A1* | 11/2005 | Park et al. ...................... 370/343 |
| 2006/0199596 A1* | 9/2006 | Teauge et al. ................. 455/458 |

* cited by examiner

RECONFIGURABLE ORTHOGONAL FREQUENCY DIVISION MULTIPLEXING (OFDM) CHIP SUPPORTING SINGLE WEIGHT DIVERSITY

CROSS-REFERENCE TO RELATED APPLICATIONS/INCORPORATION BY REFERENCE

The present application is a continuation-in-part of application Ser. No. 10/645,349, filed on Aug. 21, 2003 now U.S. Pat. No. 7,148,845, which makes reference to, claims priority to and claims benefit from United States Provisional Patent Application Ser. No. 60/405,285 filed on Aug. 21, 2002.

This application makes reference to:
U.S. application Ser. No. 11/237,002 filed Sept. 28, 2005; and
U.S. application Ser. No. 11/237,045 filed Sept. 28, 2005.

Each of the above stated applications is hereby incorporated by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to processing of signals in communication systems. More specifically, certain embodiments of the invention relate to a reconfigurable orthogonal frequency division multiplexing (OFDM) chip supporting single weight diversity.

BACKGROUND OF THE INVENTION

Mobile communications has changed the way people communicate and mobile phones have been transformed from a luxury item to an essential part of every day life. The use of mobile devices is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet and/or mobile video are poised to become a common source of everyday information, and easy, versatile mobile access to this data will be taken for granted.

Third generation (3G) cellular networks, for example, have been specifically designed to fulfill these future demands of the mobile devices. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers. In this regard, networks based on wideband CDMA (WCDMA) technology may make the delivery of data to end users a more feasible option for today's wireless carriers. The GPRS and EDGE technologies may be utilized for enhancing the data throughput of present second generation (2G) systems such as GSM. Moreover, HSDPA technology is an Internet protocol (IP) based service, oriented for data communications, which adapts WCDMA to support data transfer rates on the order of 10 megabits per second (Mbits/s).

In addition to cellular technologies, technologies such as those developed under the IEEE 802.11 and 802.16 standards, and/or the digital video broadcasting (DVB) standard, may also be utilized to fulfill these future demands of the mobile devices. For example, wireless local area networks (WLAN), wireless metropolitan area networks (WMAN), and DVB networks may be adapted to support mobile Internet an/or mobile video applications, for example. The digital video broadcasting (DVB) standard, for example, is a set of international open standards for digital television maintained by the DVB Project, an industry consortium, and published by a Joint Technical Committee (JTC) of European Telecommunications Standards Institute (ETSI), European Committee for Electrotechnical Standardization (CENELEC) and European Broadcasting Union (EBU). The DVB systems may distribute data by satellite (DVB-S), by cable (DVB-C), by terrestrial television (DVB-T), and by terrestrial television for handhelds (DVB-H). The standards may define the physical layer and data link layer of the communication system. In this regard, the modulation schemes used may differ in accordance to technical and/or physical constraints. For example, DVB-S may utilize QPSK, DVB-C may utilize QAM, and DVB-T and DVB-H may utilize OFDM in the very high frequency (VHF)/ultra high frequency (UHF) spectrum.

These networks may be based on frequency division multiplexing (FDM). The use of FDM systems may result in higher transmission rates by enabling the simultaneous transmission of multiple signals over a single wireline or wireless transmission path. Each of these signals may comprise a carrier frequency modulated by the information to be transmitted. In this regard, the information transmitted in each signal may comprise video, audio, and/or data, for example. The orthogonal FDM (OFDM) spread spectrum technique may be utilized to distribute information over many carriers that are spaced apart at specified frequencies. The OFDM technique may also be referred to as multi-carrier or discrete multi-tone modulation. The spacing between carriers prevents the demodulators in a radio receiver from seeing frequencies other than their own. This technique may result in spectral efficiency and lower multi-path distortion, for example.

In both cellular and OFDM-based networks, the effects of multipath and signal interference may degrade the transmission rate and/or quality of the communication link. In this regard, multiple transmit and/or receive antennas may be utilized to mitigate the effects of multipath and/or signal interference on signal reception and may result in an improved overall system performance. These multi-antenna configurations may also be referred to as smart antenna techniques. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and to suppress interference generated within the signal reception process. Such diversity gains improve system performance by increasing received signal-to-noise ratio, by providing more robustness against signal interference, and/or by permitting greater frequency reuse for higher capacity. In communication systems that incorporate multi-antenna receivers, a set of M receive antennas may be utilized to null the effect of (M-1) interferers, for example. Accordingly, N signals may be simultaneously transmitted in the same bandwidth using N transmit antennas, with the transmitted signal then being separated into N respective signals by way of a set of N antennas deployed at the receiver. Systems that utilize multiple transmit and receive antennas may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power, the capacity offered by a MIMO configuration may scale with the increased signal-to-noise ratio (SNR). For example, in the case of fading multipath channels, a MIMO configuration may increase system capacity by nearly M additional bits/cycle for each 3-dB increase in SNR.

However, the widespread deployment of multi-antenna systems in wireless communications, particularly in wireless handset devices, has been limited by the increased cost that results from increased size, complexity, and power consumption. Providing separate RF chain for each transmit and receive antenna is a direct factor that increases the cost of multi-antenna systems. Each RF chain generally comprises a low noise amplifier (LNA), a filter, a downconverter, and an analog-to-digital converter (A/D). In certain existing single-antenna wireless receivers, the single required RF chain may account for over 30% of the receiver's total cost. It is therefore apparent that as the number of transmit and receive antennas increases, the system complexity, power consumption, and overall cost may increase. This poses problems for mobile system designs and applications.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a reconfigurable orthogonal frequency division multiplexing (OFDM) chip supporting single weight diversity, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the invention may be found in a system and/or method for a reconfigurable orthogonal frequency division multiplexing (OFDM) chip supporting single weight diversity. In accordance with various embodiments of the invention, the reconfigurable OFDM chip may be configured to process signals such as IEEE 802.11, 802.16, and digital video broadcasting (DVB). The OFDM chip may generate channel weights to be applied to signals received in receive antennas. The weighted signals may be combined into a single received signal and channel estimates may be generated from the single received signal. Updated channel weights may be generated from the generated channel estimates. Updates to the channel weights may be performed dynamically. The configurable OFDM chip may be utilized to provide collaborative cellular and OFDM-based communication. The reconfigurable OFDM chip and the cellular chip may communicate data and/or control information via a memory coupled to a common bus.

Figure 1A:
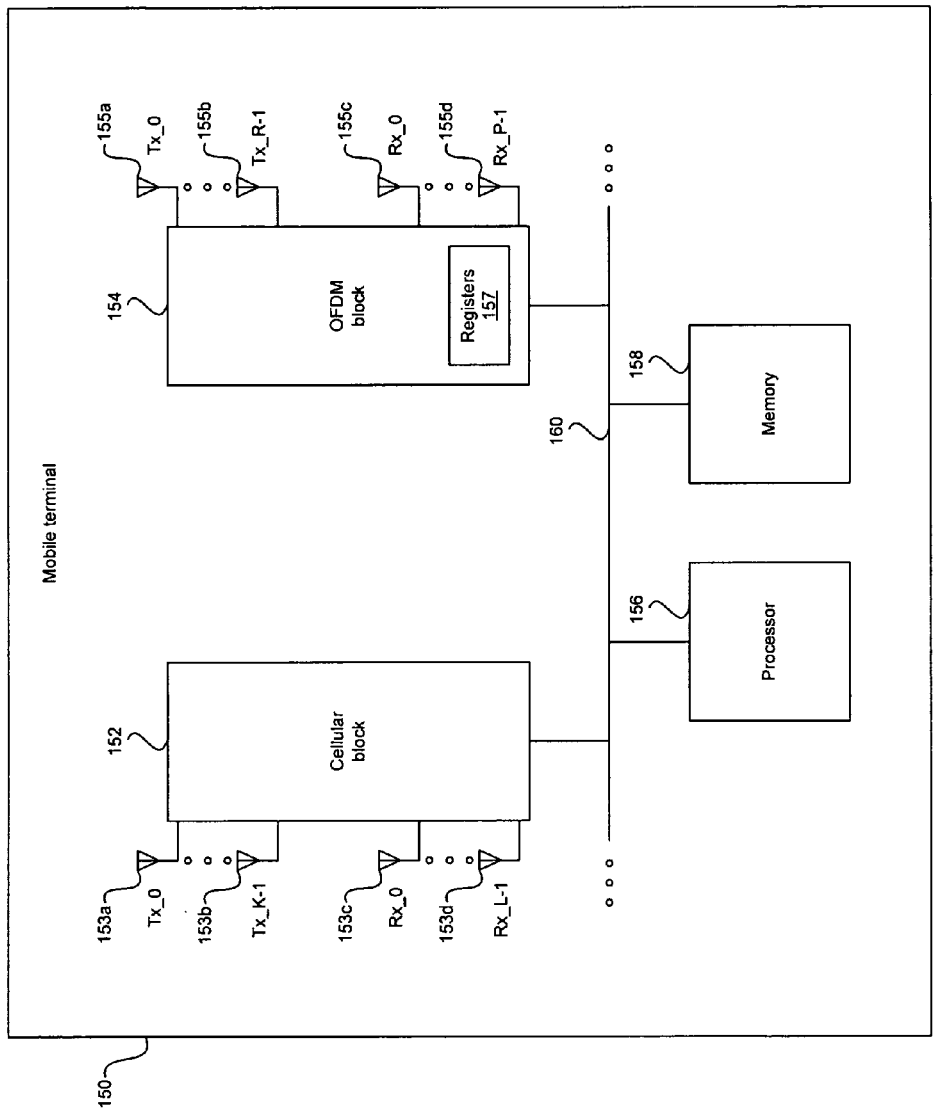
FIG. 1A is a block diagram illustrating an exemplary cellular and OFDM collaboration system with single channel weight diversity, in accordance with an embodiment of the invention.

FIG. 1A is a block diagram illustrating an exemplary cellular and OFDM collaboration system with single channel weight diversity, in accordance with an embodiment of the invention. Referring to FIG. 1A, there is shown a mobile terminal 150 that may comprise a cellular block 152, an OFDM block 154, a processor 156, a memory 158, and a common bus 160. The OFDM block 154 may comprise a plurality of registers 157. The mobile terminal 150 may be utilized for receiving and/or transmitting cellular and/or OFDM-based information, such as DVB-H information for example. The cellular block 152 may comprise suitable logic, circuitry, and/or code that may be adapted to process cellular information. The cellular block 152 may be adapted to transmit cellular information via at least one transmit antenna. In this regard, there are shown K transmit antennas 153a (Tx_0), ..., 153b (Tx_K-1). When K>1 the cellular block 152 may support transmit diversity techniques, for example. The cellular block 152 may also be adapted to receive cellular information via at least one receive antenna. In this regard, there are shown L receive antennas 153c (Rx_0), ..., 153d (Rx_L-1). When L>1 the cellular block 152 may support receive diversity techniques, for example. The cellular block 152 may be adapted to support at least one of a plurality of cellular technologies such as CDMA, WCDMA, HSDPA, GSM, and/or UMTS, for example.

The cellular block 152 may be adapted to transfer data and/or control information to the OFDM block 154 via the common bus 160. In some instances, the cellular block 152 may transfer data and/or control information to the OFDM block 154 via the common bus 160 directly. In other instances, the data and/or control information may be first transferred from the cellular block 152 to the memory 156 via the common bus 160 and then transferred from the memory 156 to the OFDM block 154 via the common bus 160.

The OFDM block 154 may comprise suitable logic, circuitry, and/or code that may be adapted to process information communicated by OFDM modulation techniques. The OFDM block 154 may be adapted to transmit information via at least one transmit antenna. In this regard, there are shown R transmit antennas 155a (Tx_0), ..., 155b (Tx_R-1). When R>1 the OFDM block 154 may support transmit diversity techniques, for example. An exemplary diversity technique that may be utilized by the OFDM block 154 for transmission is single weight diversity. The OFDM block 154 may also be adapted to receive information via at least one receive antenna. In this regard, there are shown P receive antennas 155c (Rx_0), ..., 155d (Rx_P-1). When P>1 the OFDM block 154 may support receive diversity techniques, for example. An exemplary diversity technique that may be utilized by the OFDM block 154 for reception is single weight diversity. U.S. application Ser. No. 11/173,964, U.S. application Ser. No. 11/173,252, U.S. application Ser. No. 11/174,252 provide a detailed description of channel estimation and single weight generation and are hereby incorporated herein by reference in their entirety. The OFDM block 154 may be adapted to support at least one of a plurality of OFDM-based technologies such as wireless local area networks (WLANs) based on IEEE 802.11, wireless metropolitan area networks (WMANs) based on 802.16, and digital video broadcasting for handhelds (DVB-H), for example.

The OFDM block 154 may be adapted to transfer data and/or control information to the cellular block 152 via the common bus 160. In some instances, the OFDM block 154 may transfer data and/or control information to the cellular block 155 via the common bus 160 directly. In other instances, the data and/or control information may be first transferred from the OFDM block 154 to the memory 156 via the common bus 160 and then transferred from the memory 156 to the OFDM block 154 via the common bus 160.

The OFDM block 154 may be a configurable device and at least a portion of the OFDM block 154 may be configured in accordance with one of the OFDM technologies that may be supported. For example, certain aspects in the OFDM block 154 that may be configured may comprise forward error correction (FEC), parsing, interleaving, mapping, fast Fourier transformations (FFTs), and/or guard interval insertion. Other aspects of the OFDM block 154 that may be configured may comprise operating bandwidth, auto detection of multiple preambles, channel estimation, and/or header cyclic redundancy check (CRC) length, for example. In this regard, the plurality of registers 157 may comprise suitable logic, circuitry, and/or code that may be adapted to store values and/or parameters that correspond to the configurable aspects of the OFDM block 154. To configure the OFDM block 154, the values and/or parameters to be stored in the plurality of registers 157 may be transferred from the memory 158 via the common bus 160 based on at least one control signal generated by the processor 156, for example.

The processor 156 may comprise suitable logic, circuitry, and/or code that may be adapted to perform control and/or management operations for the mobile terminal 150. In this regard, the processor 156 may be adapted to generate at least one signal for configuring the OFDM block 154. Moreover, the processor 156 may be adapted to arbitrate and/or schedule communications between the cellular block 152 and the OFDM block 154 when collaborative communication is to be utilized. In some instances, the arbitration and/or scheduling operation may be performed by logic, circuitry, and/or code implemented separately from the processor 156. The processor 156 may also be adapted to control single weight diversity operations in the OFDM block 154. For example, the processor 156 may control the integration time utilized when generating channel weights for receive and/or transmit antennas in the OFDM block 154. The memory 158 may comprise suitable logic, circuitry, and/or code that may be adapted to store information that may be utilized by the cellular block 152, the OFDM block 154, and/or the processor 156. In this regard, the memory 158 may store parameters associated with the various configurations supported by the OFDM block 154.

In operation, when an OFDM configuration mode has been selected, the processor 156 may generate at least one signal to transfer configuration information from the memory 156 to the plurality of registers 157 in the OFDM block 154 via the common bus 160. In this regard, exemplary OFDM configuration modes may comprise WLAN modes, WMAN modes, and DVB-H modes. The OFDM block 154 may receive and transmit information in accordance to the OFDM configuration mode currently supported. Similarly, the cellular block 152 may receive and/or transmit cellular information. When single weight diversity is supported by the transmit and/or receive operations of the OFDM block 154, appropriate channel weights may be generated by the OFDM block 154 to at least one of the transmit antennas 155a (Tx_0), ..., 155b (Tx_R-1) and/or at lest one of the receive antennas 155c (Rx_0), ..., 155d (Rx_P-1).

When cellular communication may be more efficiently performed via the OFDM block 154, the processor 156 may coordinate the transfer of information from the cellular block 152 to the OFDM block 154. In this regard, information from the cellular block 152 may be transferred to the memory 158 and then from the memory 158 to the OFDM block 154. Similarly, when OFDM-based communication may be more efficiently performed via the cellular block 152, the processor 156 may coordinate the transfer of information from the OFDM block 154 to the cellular block 152. In this regard, information from the OFDM block 154 may be transferred to the memory 158 and then from the memory 158 to the cellular block 152.

Figure 1B:
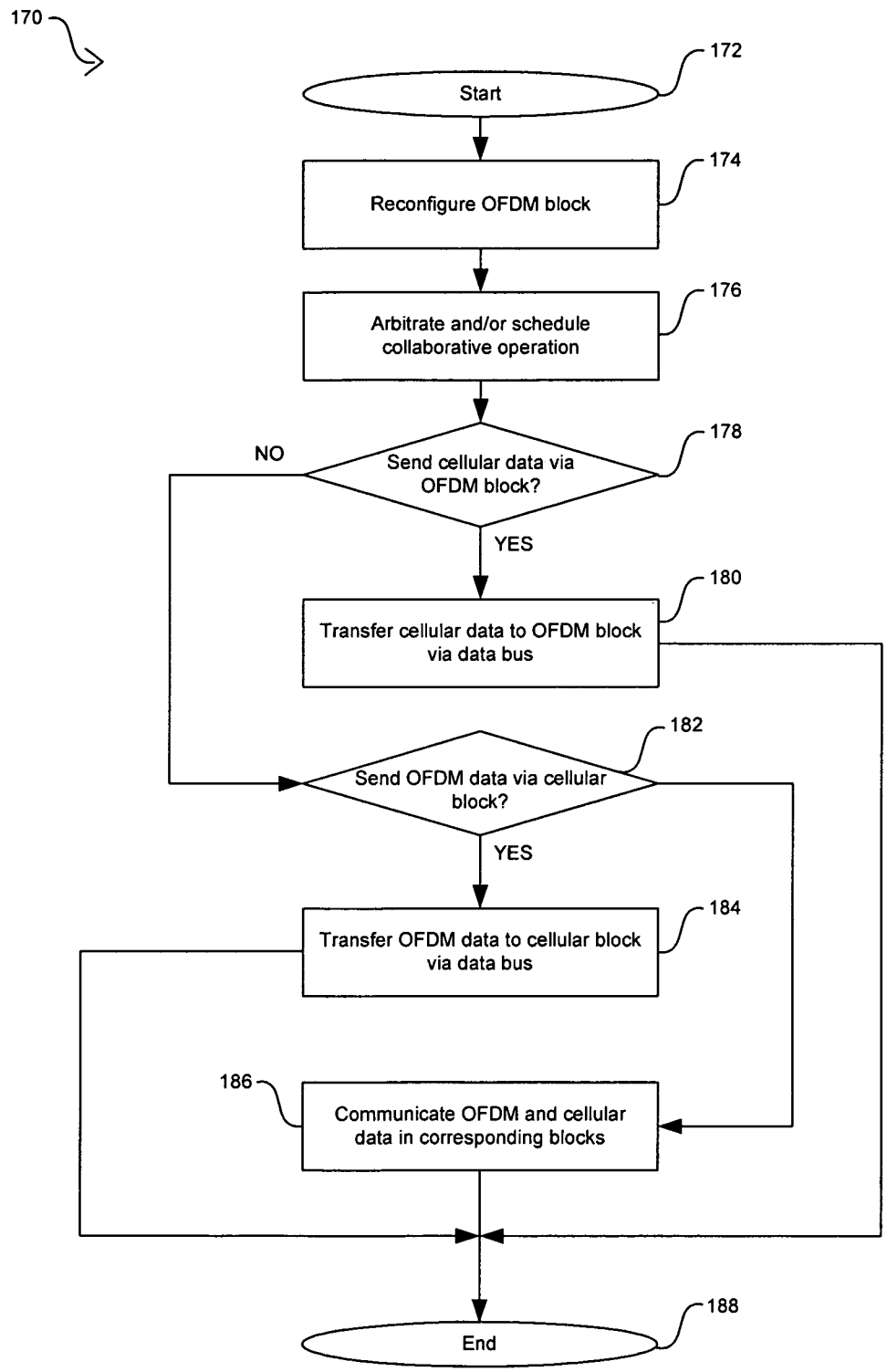
FIG. 1B is a flow chart illustrating exemplary steps for cellular and OFDM collaboration, in accordance with an embodiment of the invention.

FIG. 1B is a flow chart illustrating exemplary steps for cellular and OFDM collaboration, in accordance with an embodiment of the invention. Referring to FIG. 1B, there is shown a flow diagram 170 for collaborative operation of cellular and OFDM communication in the mobile terminal 150 in FIG. 1A. After start step 172, in step 174, the processor 156 may configure the OFDM block 154 to operate in one of a plurality of OFDM configuration modes. The parameters that support each OFDM configuration mode may be transferred to the plurality of registers 157 in the OFDM block from the memory 156.

In step 176, the processor 156 may arbitrate and/or schedule collaborative communication between the cellular block 152 and the OFDM block 154. In this regard, the processor 156 may determine, based on information provided by the cellular block 152 and/or the OFDM block 154, whether cellular data may be communicated by utilizing the OFDM block 154 or whether OFDM-based information may be communicated by utilizing the cellular block 152. For example, when the quality of WCDMA communication link supported by the cellular block 152 becomes low and the transmission rate via that WCDMA communication link degrades, the cellular block 152 may generate a signal to the processor 156 to provide access to the cellular data to its recipient via the OFDM block 154. Similarly, when the quality of WLAN communication link supported by the OFDM block 154 becomes low and the transmission rate via that WLAN communication link degrades, the OFDM block 154 may generate a signal to the processor 156 to provide access to the WLAN information to its recipient via the cellular block 152. In either case, the processor 156 may request information from the other block to determine whether the necessary resources for collaboration are available. When the resources are available, collaboration between the OFDM block 154 and the cellular block 152 may be implemented.

In step 178, when the processor 156 determines that cellular data may be sent via the OFDM block 154, that is, collaboration may be implemented, the process may proceed to step 180. In step 180, the cellular data may be transferred to the OFDM block 154 from the cellular block 152 via the common bus 160. In this regard, the cellular data may be first stored in the memory 158 before final transfer to the OFDM block 154. After step 180 the process may proceed to end step 188.

Returning to step 178, when the processor 156 determines that cellular data may not be sent via the OFDM block 154, that is, collaboration may not be implemented, the process may proceed to step 182. In step 182, when the processor 156 determines that OFDM data may be sent via the cellular block 152, that is, collaboration may be implemented, the process may proceed to step 184. In step 184, the OFDM data may be transferred to the cellular block 152 from the OFDM block 154 via the common bus 160. In this regard, the OFDM data may be first stored in the memory 158 before final transfer to the cellular block 152. After step 184 the process may proceed to end step 188.

Returning to step 182, when the processor 156 determines that OFDM data may not be sent via the cellular block 152, that is, collaboration may not be implemented, the process may proceed to step 186. In step 186, the cellular data may be sent via the cellular block 152 and/or the OFDM data may be sent via the OFDM block 154 in accordance with the communication rates that may be supported by each of those blocks. In this regard, when collaboration may not be implemented, the cellular communication and the OFDM-based communication of the mobile terminal 150 may each be limited by their corresponding communication links.

Figure 1C:
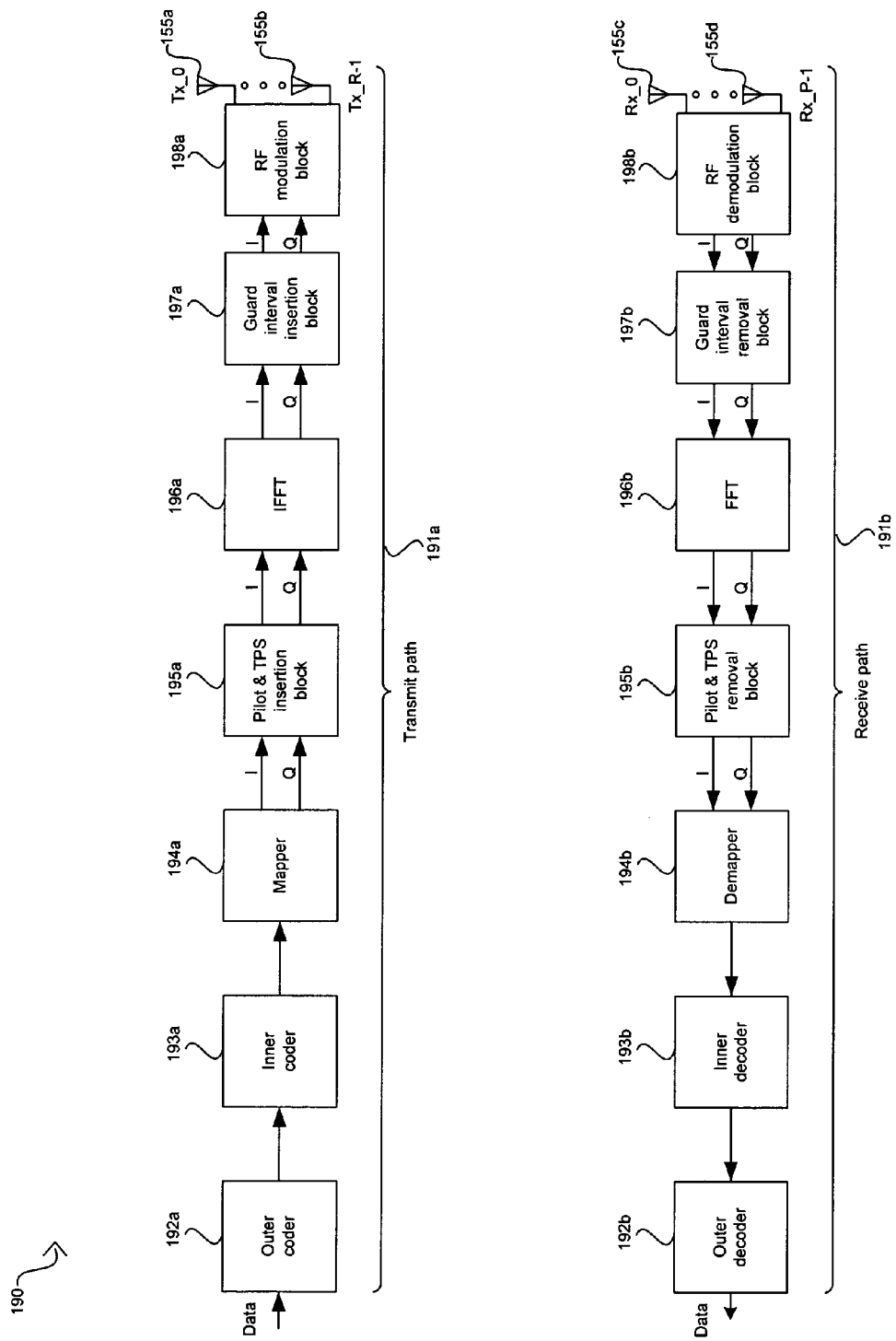
FIG. 1C is a block diagram illustrating an exemplary reconfigurable OFDM chip with single channel weight diversity, in accordance with an embodiment of the invention.

FIG. 1C is a block diagram illustrating an exemplary reconfigurable OFDM chip with single channel weight diversity, in accordance with an embodiment of the invention. Referring to FIG. 1C, there is shown a reconfigurable OFDM block 190 that may comprise a transmit path 191a and a receive path 191b. The reconfigurable OFDM block 190 may be adapted to support single weight diversity in the transmit path 191a and/or in the receive path 191b, for example. The transmit path 191a may comprise an outer coder 192a, an inner coder 193a, a mapper 194a, a pilot and transmission parameter signaling (TPS) insertion block 195a, an inverse FFT (IFFT) 196a, a guard interval insertion block 197a, and a radio frequency (RF) modulation block 198a. The receive path 191b may comprise an RF modulation block 198b, a guard interval removal block 197b, an FFT 196b, a pilot and TPS removal block 195b, a demapper 194b, an inner decoder 193b, and an outer decoder 192b.

The outer coder 192a may comprise suitable logic, circuitry, and/or code that may be adapted to provide a first encoding of the data to be transmitted. For example, the outer coder 192a may be adapted to perform a Reed-Solomon error correction encoding operation. In this regard, the outer coder 192a may be utilized to implement forward error correction (FEC) operations, for example, where such FEC operations of the outer coder 192a may be configurable. The inner coder 193a may comprise suitable logic, circuitry, and/or code that may be adapted to provide a second encoding of the data to be transmitted. For example, the inner coder 193a may be adapted to perform a convolutional code on the output of the outer coder 192a. When the inner coder 193a is implemented utilizing a convolutional encoder, the convolutional encoder may be configured to an encoding rate of R=½, and an encoder's length constraint ranging between K=7 and K=9, for example. When the outer coder 192a is implemented utilizing a puncturer, the rates of the puncturer may be configured to ⅔, ¾, or ⅚, for example. A puncturer may be utilized to periodically delete selected bits to reduce coding overhead. In some instances, the outer coder 192a may be implemented using an interleaver, for example. When appropriate, the encoding rate, the encoder's length constraint, the interleaver, and/or the puncturer rate of the inner coder 193a may be configurable.

The mapper 194a may comprise suitable logic, circuitry, and/or code that may be adapted to map the output of the inner coder 193a to a specified modulation constellation. For example, the mapper 194a may be adapted to perform X-QAM, where X indicates the size of the constellation to be used for quadrature amplitude modulation. The mapper 194a may be configured to map the output of the inner coder 193a to quadrature phase shift keying (QPSK), binary phase shift keying (BPSK), 16-QAM, or 64-QAM, for example. Moreover, the mapping performed by the mapper 194a may result in an in-phase (I) data stream and a phase quadrature (Q) data stream.

The pilot and TPS insertion block 195a may comprise suitable logic, circuitry, and/or code that may be adapted to insert OFDM pilot signals and/or transmission parameters signals into the I and Q data streams. The IFFT 196a may comprise suitable logic, circuitry, and/or code that may be adapted to perform an inverse FFT operation of the output of the pilot and TPS insertion block 195a. In this regard, the number of points to be used by the IFFT 196a may be configurable and may be modified in accordance with the OFDM configuration mode selected. The IFFT 196a may have a range from 64 points to 8K points, for example. The IFFT 196a may be implemented as a one-dimensional IFFT for data, text, and/or audio applications, and may be implemented as a two-dimensional IFFT for images and/or video applications, for example. The guard interval insertion block 197a may comprise suitable logic, circuitry, and/or code that may be adapted to insert a guard interval into the contents of the I and Q data streams. The time interval inserted by the guard interval insertion block 197a may be configurable. For example, the time interval inserted may range between 400 ns and 800 ns.

The RF modulation block 198a may comprise suitable logic, circuitry, and/or code that may be adapted to modulate the output of the guard interval insertion block 197a in accordance with the OFDM configuration mode. In this regard, the operating bandwidth of the RF modulation block 198a may be configurable. The operating bandwidth may range between 20 MHz and 80 Mhz, for example. When the RF modulation block 198a supports single weight diversity, channel weights to be applied to at least one of the R transmit antennas 155a (Tx_0), . . . , 155b (Tx_R-1) may be generated by the RF modulation block 198a. The RF modulation block 198a may then transmit weighted signals via the R transmit antennas 155a (Tx_0), . . . , 155b (Tx_R-1).

The RF demodulation block 198b may comprise suitable logic, circuitry, and/or code that may be adapted to demodulate the input signals received via the P receive antennas 155c (Rx_0), . . . , 155d (Rx_P-1). For example, the operating bandwidth of the RF demodulation block 198b may be configurable. In this regard, the operating bandwidth may range between 20 MHz and 80 Mhz, for example. When the RF demodulation block 198b supports single weight diversity, channel weights to be applied to at least one of the P receive antennas 155c (Rx_0), . . . , 155d (Rx_P-1) may be generated by the RF demodulation block 198b. The RF modulation block 198b may then transfer the I and Q data streams generated from a combination of the weighted received signals to the guard interval removal block 187b. The weight generation in the RF demodulation block 198b may be configurable. For example, channel estimation operations for weight generation may be configured in a per-tone estimation basis.

The guard interval removal block 197b may comprise suitable logic, circuitry, and/or code that may be adapted to remove a guard interval introduced into the contents of the I and Q data streams. The time interval removal by the guard interval removal block 197a may be configurable. For example, the time interval removal may range between 400 ns and 800 ns and may be selected in accordance with the OFDM configuration mode.

The FFT 196b may comprise suitable logic, circuitry, and/or code that may be adapted to perform an FFT operation of the output of the guard interval removal block 197b. In this regard, the number of points to be used by the FFT 196b may be configurable and may be modified in accordance with the OFDM configuration mode selected. The FFT 196b may have a range from 64 points to 8K points, for example. The FFT 196b may be implemented as a one-dimensional FFT for data, text, and/or audio applications, and may be implemented as a two-dimensional FFT for images and/or video applications, for example. The pilot and TPS removal block 195b may comprise suitable logic, circuitry, and/or code that may be adapted to remove OFDM pilot signals and/or transmission parameters signals inserted into the I and Q data streams.

The demapper 194b may comprise suitable logic, circuitry, and/or code that may be adapted to reverse the mapping of the I and Q data streams from the pilot and TPS removal block 195b. The demapper 194b may be configured to reverse map QPSK, BPSK, 16-QAM, or 64-QAM, for example. Moreover, the reverse mapping performed by the demapper 194b may result in a combined data stream from the I and Q data streams from the pilot and TPS removal block 195b.

The inner decoder 193b may comprise suitable logic, circuitry, and/or code that may be adapted to provide a first decoding of the data received. For example, the inner decoder 193b may be adapted to perform a Viterbi decoding on the output of the demapper 194b. When appropriate, the decoding rate, the decoder's length constraint, and/or the puncturer rate of the inner decoder 193ba may be configurable.

The outer decoder 192b may comprise suitable logic, circuitry, and/or code that may be adapted to provide a second decoding of the data to be received. For example, the outer decoder 192b may be adapted to perform a Reed-Solomon error correction decoding operation. In this regard, the outer decoder 192a FEC operations may be configurable. The output of the outer decoder 192b is the signal or data received.

The configurable portions of the reconfigurable OFDM block 190 in FIG. 1C may be programmed via the plurality of registers 157 in FIG. 1A. In this regard, the processor 156 may generate at least one signal to transfer the appropriate values to be utilized by the configurable portions of the reconfigurable OFDM block 190 from the memory 158 to the plurality of registers 157.

During transmission operation, the processor 156 may generate at least one signal to program portions of the transmit path 191a and portions of the receive path 191b in accordance with a selected OFDM configuration mode. Data to be transmitted may be first encoded by the outer coder 192a and then by the inner coder 193a. The output of the inner coder 193a may be mapped in the mapper 194a to the configured constellation to generate I and Q data streams. The pilot and TPS insertion block 195a may insert signals into the I and Q data streams generated by the mapper 194a. The IFFT 196a may operate on the output of the pilot and TPS insertion block 195a in accordance with the configured number of points and may transfer the results to the guard interval insertion block 197a. The guard interval insertion block 197a may insert a configured time interval into the contents of the I and Q data streams and may transfer the results to the RF modulation block 198a. The RF modulation block 198a may modulate the signals received from the guard interval insertion block 197a. The RF modulation block 198a, when supporting single weight diversity, may generate channel weights that may be utilized to generate a plurality of signals to be transmitted via the R transmit antennas 155a (Tx_0), . . . , 155b (Tx_R-1).

During reception operation, signals may be received by the P receive antennas 155d (Rx_0), . . . , 155d (Rx_P-1). When supporting single weight diversity, the RF demodulation block 198b may generate channel weights to modify the received signals. A single received signal for RF demodulation may be generated by combining the weighted received signals. The RF demodulation block 198b may generate I and Q data streams by demodulating the single received signal generated. The guard interval removal block 197b may remove a configured time interval from the contents of the I and Q data streams and may transfer the results to the FFT 196b. The FFT 196b may operate on the output of the guard interval removal block 197b in accordance with the configured number of points and may transfer the results to the pilot and TPS removal block 195b. The pilot and TPS removal block 195b may remove signals inserted into the I and Q data streams and may transfer the results to the demapper 194b. The demapper 194b may reverse map the I and Q data streams outputs from the pilot and TPS removal block 195b into a single data stream in accordance with the configuration provided. The inner decoder 193b may decode the data stream from the demapper 195$_{4b}$ and the outer decoder 192$b$ may decode the data stream from the inner decoder 193$b$. In this regard, the inner decoder 193$b$ and the outer decoder 192$b$ may perform decoding operations that correspond to the encoding operations performed by the inner coder 193$a$ and the outer coder 192$a$ respectively. The output of the outer decoder 192$b$ may correspond to the received data.

U.S. application Ser. No. 11/237,002 and U.S. application Ser. No. 11/237,045 provide a detailed description of a configurable OFDM block and are hereby incorporated herein by reference in their entirety.

Figure 2A:
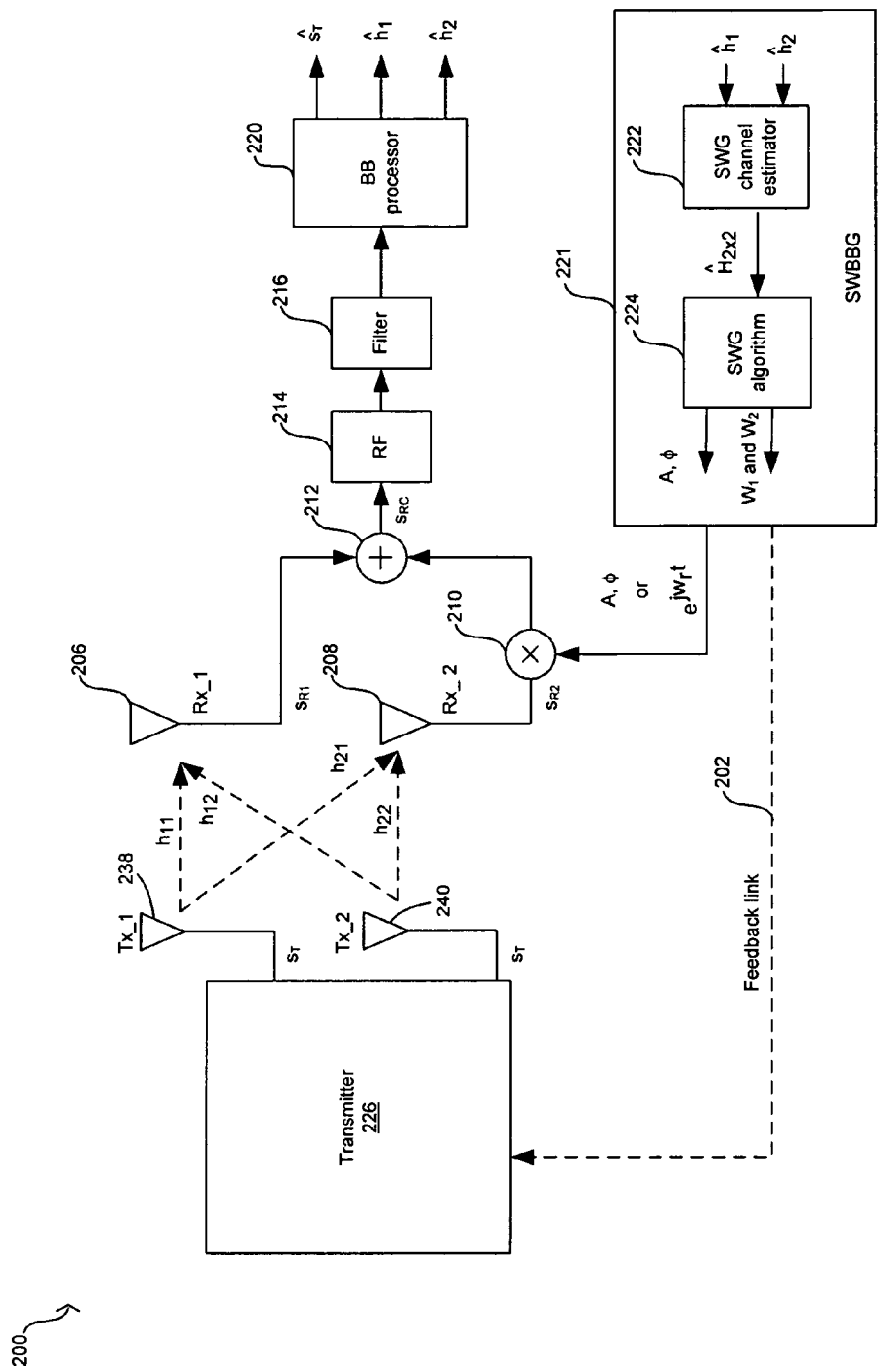
FIG. 2A is a block diagram of an exemplary two-transmit (2-Tx) and two-receive (2-Rx) antennas wireless communication system with receiver channel estimation, in accordance with an embodiment of the invention.

FIG. 2A is a block diagram of an exemplary two-transmit (2-Tx) and two-receive (2-Rx) antennas wireless communication system with receiver channel estimation, in accordance with an embodiment of the invention. Referring to FIG. 2A, the wireless communication system 200 may comprise a transmitter 226, a first transmit antenna (Tx__1) 238, an additional transmit antenna (Tx__2) 240, a first receive antenna (Rx__1) 206, and an additional receive antenna (Rx__2) 208. The wireless communication system 200 may further comprise a mixer 210, an adder 212, an RF block 214, a filter 216, a baseband (BB) processor 220, a single weight baseband generator (SWBBG) 221, a single weight generator (SWG) channel estimator 222, and a SWG algorithm block 224.

The transmitter 226 may comprise suitable logic, circuitry, and/or code that may be adapted to process single channel (SC) communication signals for transmission utilizing OFDM modulation techniques. The transmitter 226 may also be adapted to receive feedback from a wireless receiver via a feedback link 202. The transmitter 226 may be adapted to transmit signals via the first transmit antenna (Tx__1) 238 and the additional transmit antenna (Tx__2) 240. The first transmit antenna, Tx__1 238, and the additional or second transmit antenna, Tx__2 240, may comprise suitable hardware that may be adapted to transmit a plurality of SC communication signals, $s_T$, from the transmitter 226. The first receive antenna, Rx__1 206, and the additional or second receive antenna, Rx__2 208, may comprise suitable hardware that may be adapted to receive at least a portion of the transmitted SC communication signals in a wireless receiver device. For example, the receive antenna Rx__1 206 may receive signal $s_{R1}$ while the receive antenna Rx__2 208 may receive signal $s_{R2}$. The propagation channels that corresponds to the paths taken by the SC communication signals transmitted from the transmit antennas Tx__1 238 and Tx__2 240 and received by the receive antenna Rx__1 206 may be represented by $h_{11}$ and $h_{12}$ respectively. In this regard, $h_{11}$ and $h_{12}$ may represent the actual time varying impulse responses of the radio frequency (RF) paths taken by the SC communication signals transmitted from the transmit antennas Tx__1 238 and Tx__2 240 and received by the receive antenna Rx__1 206.

Similarly, the propagation channels that corresponds to the paths taken by the SC communication signals transmitted from the transmit antennas Tx__1 238 and Tx__2 240 and received by the receive antenna Rx__2 208 may be represented by $h_{21}$ and $h_{22}$ respectively. In this regard, $h_{21}$ and $h_{22}$ may represent the actual time varying impulse responses of the RF paths taken by the SC communication signals transmitted from the transmit antennas Tx__1 238 and Tx__2 240 and received by the receive antenna Rx__2 208. In some instances, a wireless transmitter device comprising a single transmit antenna may be adapted to periodically transmit calibration and/or pilot signal that may be utilized by a 2-Rx antennas wireless receiver device to determine estimates of $h_{11}$, $h_{12}$, $h_{21}$, and $h_{22}$. The 2-Tx and 2-Rx antennas wireless communication system 200 in FIG. 2A may represent a MIMO communication system whereby the diversity gain may be increased for the transmitted data.

The mixer 210 may comprise suitable logic and/or circuitry that may be adapted to operate as a complex multiplier that may modify the amplitude and/or phase of the portion of the SC communication signals received by the receive antenna Rx__2 208 via a rotation waveform $e^{jw_r t}$ provided by the SWBBG 121, where $w_r=2\pi f_r$ and $f_r$ is the rotation frequency. In this regard, a channel weight comprising an amplitude component and phase component may be provided by the SWBBG 221 for modifying the signal received by the receive antenna Rx__2 208 to achieve channel orthogonality between the receive antenna Rx__1 206 and the receive antenna Rx__2 208. In some implementations, the mixer 210 may comprise an amplifier and a phase shifter, for example.

Through the achieved channel orthogonality, estimates of $h_{11}$, $h_{12}$, $h_{21}$, and $h_{22}$ may be determined by the SWG channel estimator 222 in the SWBBG 221. The $h_{11}$, $h_{12}$, $h_{21}$, and $h_{22}$ estimates may be utilized by the SWG algorithm block 224 to determine an optimum amplitude A and phase $\phi$ that modify signals received by the receive antenna Rx__2 208 via mixer 210 so that the receiver signal-to-interference-and-noise ratio (SINR) is maximized. In some instances, instead of utilizing the rotation waveform $e^{jw_r t}$ to achieve the channel orthogonality between the receive antenna Rx__1 106 and the receive antenna Rx__2 108, square or triangular waveforms may be also utilized. Moreover, waveforms representing different orthogonal codes may also be utilized.

In some instances, the output of the mixer 210 may be transferred to a bandpass filter, a low noise amplifier (LNA), and/or a phase shifter for further processing of the received signals. The adder 212 may comprise suitable hardware, logic, and/or circuitry that may be adapted to add the output of the receive antenna Rx__1 206 and the output of the mixer 210 to generate a combined received SC communication signal, $s_{RC}$. In some instances, bringing the output signals of the receive antenna Rx__1 206 and the mixer 210 together into a single electrical connection may provide the functionality of the adder 212. Notwithstanding, an output of the adder 212 may be transferred to the RF block 214 for further processing of the combined received SC communication signal, $s_{RC}$.

The RF block 214 may comprise suitable logic and/or circuitry that may be adapted to process the combined received SC communication signal, $s_{RC}$. The RF block 214 may perform, for example, filtering, amplification, and/or analog-to-digital (A/D) conversion operations. The BB processor 220 may comprise suitable logic, circuitry, and/or code that may be adapted to determine a first baseband combined channel estimate, $\hat{h}_1$, which may comprise information regarding propagation channels $h_{11}$ and $h_{21}$. The BB processor 220 may also be adapted to process the output of the RF block 214 to determine a second baseband combined channel estimate, $\hat{h}_2$, which may comprise information regarding propagation channels $h_{12}$ and $h_{22}$. The BB processor 220 may also be adapted to determine an estimate of the transmitted SC communication signals, $\hat{s}_T$. The filter 216 may comprise suitable logic, circuitry, and/or code that may be adapted to limit the bandwidth of the digital output from the RF block 214. The output of the filter 216 may be transferred, for example, to the BB processor 220 for further processing.

The SWBBG 221 may comprise suitable logic, circuitry, and/or code that may be adapted to receive the first and second baseband combined channel estimates, $\hat{h}_1$ and $\hat{h}_2$, from the BB processor 220 and generate phase and amplitude components of the rotation waveform to be applied by the mixer 210 to modify the portion of the SC communication signals received by the receive antenna Rx__2 208, $s_{R2}$. The SWG channel estimator 222 may comprise suitable logic, circuitry, and/or code that may be adapted to process the first and second baseband combined channel estimates, $\hat{h}_1$ and $\hat{h}_2$, generated by the BB processor 220 and may determine a matrix $\hat{H}_{2\times 2}$ of propagation channel estimates $\hat{h}_{11}$, $\hat{h}_{12}$, $\hat{h}_{21}$, and $\hat{h}_{22}$, which correspond to estimates of a matrix $H_{2\times 2}$ of time varying impulse responses $h_{11}$, $h_{12}$, $h_{21}$, and $h_{22}$ respectively. The SWG algorithm block 224 may comprise suitable logic, circuitry, and/or code that may be adapted to determine a channel weight to be transferred to the mixer 210 to modify the signal $s_{R2}$ so that the receiver SINR is maximized. The channel weight to be transferred to the mixer 210 may refer to a phase, $\phi$, and amplitude, A, that results in a maximum SINR. Moreover, the SWG algorithm block 224 may be adapted to generate feedback factors to the transmitter 226 jointly and/or concurrently with the channel weight for the mixer 210.

Figure 2B:
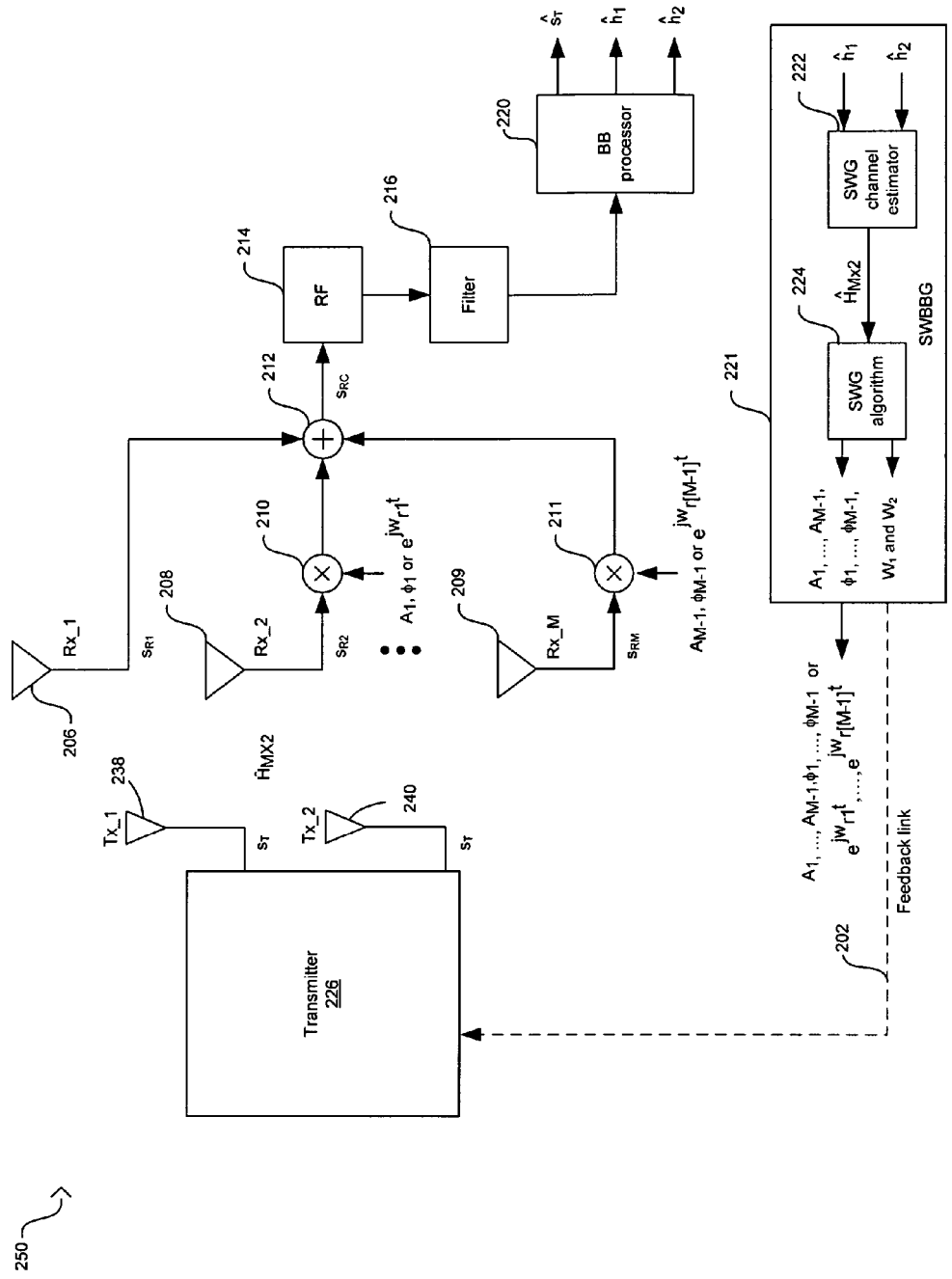
FIG. 2B is a block diagram of an exemplary two-transmit (2-Tx) and multiple-receive (M-Rx) antennas wireless communication system with receiver channel estimation, in accordance with an embodiment of the invention.

FIG. 2B is a block diagram of an exemplary two-transmit (2-Tx) and multiple-receive (M-Rx) antennas wireless communication system with receiver channel estimation, in accordance with an embodiment of the invention. Referring to FIG. 2B, the wireless communication system 250 may differ from the wireless communication system 200 in FIG. 2A in that (M-1) additional receive antennas Rx_2 208 to Rx_M 209, and (M-1) mixers 210 to 211 may be utilized, where M is the total number of receive antennas in the wireless receiver.

The propagation channels that correspond to the paths taken by the SC communication signals transmitted from the transmit antennas Tx_1 238 and Tx_2 240 and received by the receive antennas Rx_1 206 to Rx_M 209 may be represented by an M×2 matrix, $H_{M\times 2}$. The matrix $H_{M\times 2}$ may comprise propagation channels $h_{11}$ to $h_{M1}$, and $h_{12}$ to $h_{M2}$. In this regard, $h_{11}$ to $h_{M1}$ may represent the time varying impulse responses of the RF paths taken by the portion of the transmitted SC communication signals transmitted by transmit antenna Tx_1 238 and received by the receive antennas Rx_1 206 to Rx_M 209 respectively. Similarly, $h_{12}$ to $h_{M2}$ may represent the time varying impulse responses of the RF paths taken by the portion of the transmitted SC communication signals transmitted by transmit antenna Tx_2 240 and received by the receive antennas Rx_1 206 to Rx_M 209 respectively. In some instances, a wireless transmitter device comprising a first and a second transmit antenna may be adapted to periodically transmit calibration and/or pilot signals that may be utilized by an M-Rx antenna wireless receiver device to determine estimates of $h_{11}$ to $h_{M1}$ and $h_{12}$ to $h_{M2}$. The 2-Tx and M-Rx antennas wireless communication system 250 in FIG. 2B may represent a MIMO communication system whereby the diversity gain may be increased for the transmitted data.

The mixers 210 to 211 may comprise suitable logic and/or circuitry that may be adapted to operate as a complex multiplier that may modify the phase of the portion of the SC communication signals received by the receive antennas Rx_2 208 to Rx_M 209 via a rotation waveforms $e^{jw_{r1}t}$ to $e^{jw_{r(M-1)}t}$, where $w_{rk}=2\pi f_{rk}$ and $f_{rk}$ is the rotation frequency that preserves the orthogonality of the received signals at the multiple receiving antennas Rx_1 206 to Rx_M 209. The rotation frequency that preserves the signal orthogonality at the receiving antennas may be selected as $f_{rk}=kf_r$ where k=1, 2, 3, ..., M-1. Other rotation waveforms such as triangular or square waveforms may be utilized with the same frequency relationships. In addition, waveforms representing different orthogonal codes of the same frequency may be utilized. In this regard, the following exemplary sequences may be utilized: the first receive antenna Rx_1 206 may utilize the sequence [1 1 1 1], the second receive antenna Rx_2 208 may utilize the sequence [−1 −1 1 1], a third receive antenna (Rx_3) may utilize the sequence [−1 1 −1 1], and so on. In this embodiment, $e^{jw_{rk}t}$ is used as an exemplary waveform.

The channel weights comprising phase components for the rotation waveforms may be provided by the SWBBG 221 for modifying the signals received by the receive antennas Rx_2 208 to Rx_M 209 to achieve channel orthogonality between the receive antenna Rx_1 206 and the receive antennas Rx_2 208 to Rx_M 209. In some instances, the output of the mixers 210 to 211 may be transferred to a bandpass filter and/or a low noise amplifier (LNA) for further processing of the received signals. The adder 212 may comprise suitable hardware, logic, and/or circuitry that may be adapted to add the output of the receive antenna Rx_1 206 with the output of the mixers 210 to 211 to generate a combined received SC communication signal, $s_{RC}$, or gain balanced point. In some instances, bringing the output signals of the receive antenna Rx_1 206 and the mixers 210 to 211 together into a single electrical connection may provide the functionality of the adder 212. Notwithstanding, an output of the adder 212 may be transferred to the RF block 214 for further processing of the combined received SC communication signal, $s_{RC}$.

The BB processor 220 in FIG. 2B may be adapted to determine a first baseband combined channel estimate, $\hat{h}_1$, which may comprise information regarding propagation channels $h_{11}$ to $h_{M1}$. For example, a portion of $\hat{h}_1$ may comprise information regarding the propagation channels between the transmit antenna Tx_1 238 and the receive antennas Rx_1 206 and Rx_2 208, that is, $h_{11}$ and $h_{21}$, while another portion of $\hat{h}_1$ may comprise information regarding the propagation channels between the transmit antenna Tx_1 238 and the receive antennas Rx_1 206 and Rx_M 209, that is, $h_{11}$ and $h_{M1}$. The actual time varying impulse responses $h_{11}$ to $h_{M1}$, may comprise multiple propagation paths arriving at different time delays.

The BB processor 220 in FIG. 2B may also be adapted to determine a second baseband combined channel estimate, $\hat{h}_2$, which may comprise information regarding propagation channels $h_{12}$ to $h_{M2}$. For example, a portion of $\hat{h}_2$ may comprise information regarding the propagation channels between the transmit antenna Tx_2 240 and the receive antennas Rx_1 206 and Rx_2 208, that is, $h_{12}$ and $h_{22}$, while another portion of $\hat{h}_2$ may comprise information regarding the propagation channels between the transmit antenna Tx_2 240 and the receive antennas Rx_1 206 and Rx_M 209, that is, $h_{12}$ and $h_{M2}$. The actual time varying impulse responses $h_{12}$ to $h_{M2}$ may comprise multiple propagation paths arriving at different time delays. The combined channel estimates may be determined, that is, may be separated, in the BB processor 220 utilizing the orthogonality of the received signals, for example.

The SWG channel estimator 222 in FIG. 2B may be adapted to process the first and second baseband combined channel estimates, $\hat{h}_1$ and $\hat{h}_2$, determined by the BB processor 220 and may determine a matrix $\hat{H}_{M\times 2}$ of propagation channel estimates $\hat{h}_{11}$ to $\hat{h}_{M1}$, and $\hat{h}_{12}$ to $\hat{h}_{M2}$, which correspond to estimates of the matrix $H_{M\times 2}$ of time varying impulse responses $h_{11}$ to $h_{M1}$ and $h_{12}$ to $h_{M2}$, respectively. The SWG algorithm block 224 may utilize the contents of the matrix $\hat{H}_{M\times 2}$ to determine (M-1) channel weights to be applied to the mixers 210 to 211 to modify the portions of the transmitted SC communication signals received by the additional receive antennas Rx_2 208 to Rx_M 209 so that the receiver SINR is maximized, for example. The (M-1) channel weights may comprise amplitude and phase components, $A_1$ to $A_{M-1}$ and $\phi_1$ to $\phi_{M-1}$, for example. Moreover, the SWG algorithm block 224 may be adapted to generate feedback information jointly and/or concurrently with the (M-1) channel weights.

Figure 3A:
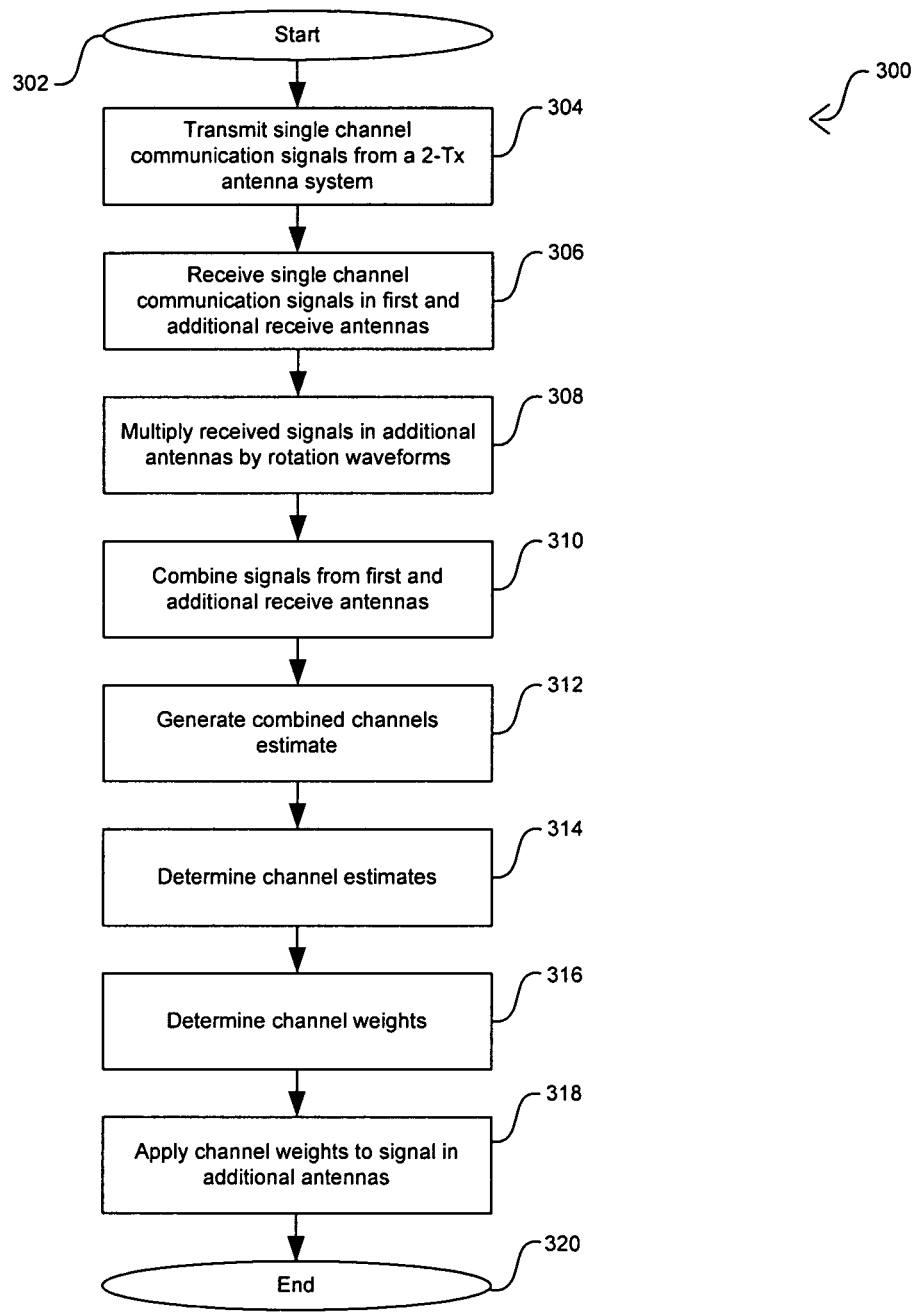
FIG. 3A is a flow diagram illustrating exemplary steps for channel estimation in a 2-Tx and M-Rx antennas wireless communication system, in accordance with an embodiment of the invention.

FIG. 3A is a flow diagram illustrating exemplary steps for channel estimation in a 2-Tx and M-Rx antennas wireless communication system, in accordance with an embodiment of the invention. Referring to FIG. 3A, after start step 302, in step 304, the SC communication signals, $s_T$, may be transmitted from the transmit antennas Tx_1 238 and Tx_2 240 in FIG. 2B. In step 306, the first and additional receive antennas, Rx_1 206 to Rx_M 209, may receive a portion of the transmitted SC communication signals. In step 308, the signals received by the additional receive antennas Rx_1 206 to Rx_M 209 may be multiplied by, for example, rotation waveforms, such as sine, square, or triangular waveforms for example, in the mixers 210 to 211 in FIG. 2B. In this regard, the rotation waveforms may have a given set of amplitude and phase component values. In step 310, the output of the receive antenna Rx_1 206 and the output of the mixers 210 to 211 associated with the additional receive antennas Rx_2 208 to Rx_M 209 may be added or combined into the received SC communication signal, $s_{RC}$. The combination may occur in the adder 212, for example.

In step 312, the BB processor 220 may determine the first and second baseband combined channel estimates, $\hat{h}_1$ and $\hat{h}_2$, which comprise information regarding propagation channels $h_{11}$ to $h_{M1}$, and $h_{12}$ to $h_{M2}$. In step 314, the SWG channel estimator 222 in the SWBBG 221 may determine the matrix $\hat{H}_{M \times 2}$ of propagation channel estimates $\hat{h}_{11}$ to $\hat{h}_{M1}$ and $\hat{h}_{12}$ to $\hat{h}_{M2}$. In this regard, the propagation channel estimates $\hat{h}_{11}$ to $\hat{h}_{M1}$ and $\hat{h}_{12}$ to $\hat{h}_{M2}$ may be determined concurrently.

Figure 3B:
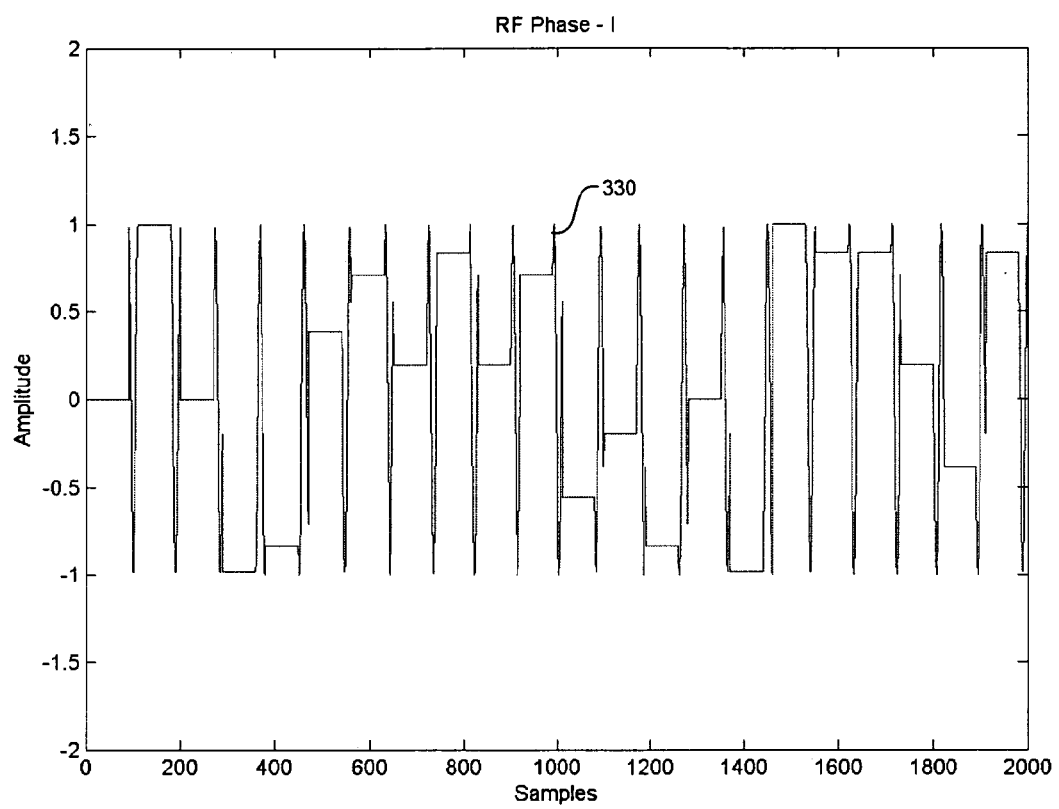
FIG. 3B illustrates an exemplary periodic phase rotation for an in-phase (I) signal received in one of the additional receive antennas, in accordance with an embodiment of the invention.

In step 316, the (M-1) maximum SNIR channel weights that comprise amplitude and phase components, $A_1$ to $A_{M-1}$ and $\phi_1$ to $\phi_{M-1}$, may be generated concurrently. The feedback information provided to the transmitter 226 may be generated concurrently with the (M-1) maximum SNIR channel weights. In step 318, additional SC communication signals received may be phase and amplitude adjusted based on the maximum SNIR channel weights applied to the mixers 210 to 211. The channel estimation phase rotation and the maximum SINR phase/amplitude adjustment described in flow chart 300 may be performed continuously or may be performed periodically. In this regard, FIG. 3B illustrates an exemplary periodic phase rotation for an in-phase (I) signal 330 received in one of the additional receive antennas, in accordance with an embodiment of the invention. Aspects of single weight diversity operations and/or implementations as described in FIGS. 2A-3B may also be utilized in the reconfigurable OFDM block 190 in FIG. 1C.

Figure 4A:
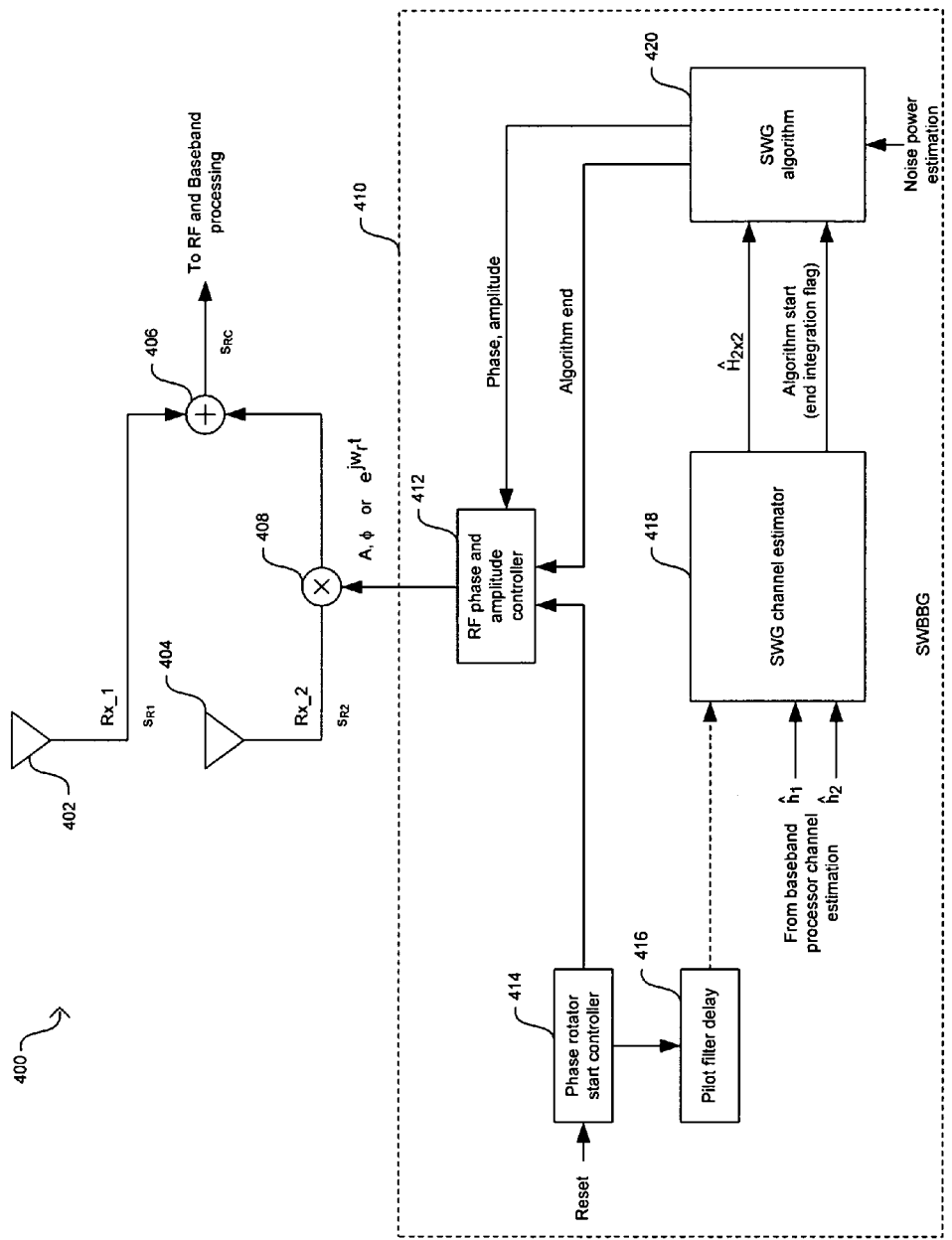
FIG. 4A is a block diagram of an exemplary single weight baseband generator (SWBBG) that may be utilized in a 2-Tx and 2-Rx antennas system, in accordance with an embodiment of the invention.

FIG. 4A is a block diagram of an exemplary single weight baseband generator (SWBBG) that may be utilized in a 2-Tx and 2-Rx antennas system, in accordance with an embodiment of the invention. Referring to FIG. 4A, a receiver system 400 may comprise a first receive antenna (Rx_1) 402, an additional receive antenna (Rx_2) 404, an adder 406, a mixer 408, and a single weight baseband generator (SWBBG) 410. The SWBBG 410 may comprise a phase rotator start controller 414, a delay block 416, a single weight generator (SWG) channel estimator 418, an SWG algorithm block 420, and an RF phase and amplitude controller 412. The SWBBG 410 may represent an exemplary implementation of the SWBBG 221 in FIG. 2B. At least some of the various portions of the receiver system 400 in FIG. 4A may be implemented in the reconfigurable OFDM block 190 in FIG. 1C to support single weight diversity, for example.

The first receive antenna, Rx_1 402, and the additional or second receive antenna, Rx_2 404, may comprise suitable hardware that may be adapted to receive at least a portion of transmitted SC communication signals in the receiver system 400. For example, the receive antenna Rx_1 402 may receive a signal $s_{R1}$ while the receive antenna Rx_2 404 may receive a signal $s_{R2}$. The mixer 408 may correspond to, for example, the mixer 210 in FIG. 2B. In some instances, the output of the mixer 308 may be communicated to a bandpass filter and/or a low noise amplifier (LNA) for further processing of the received signals.

The adder 406 may comprise suitable hardware, logic, and/or circuitry that may be adapted to add the output of the receive antenna Rx_1 402 and the output of the mixer 408 to generate a combined received SC communication signal, $s_{RC}$. In some instances, bringing the output signals of the receive antenna Rx_1 402 and the mixer 408 together into a single electrical connection may provide the functionality of the adder 406. The output of the adder 406 may be transferred to additional processing blocks for RF and baseband processing of the combined received SC communication signal, $s_{RC}$.

The phase rotator and start controller 414 may comprise suitable logic, circuitry, and/or code that may be adapted to control portions of the operation of the RF phase and amplitude controller 412 and to control the delay block 416. The phase rotator and start controller 414 may receive a signal, such as a reset signal, from, for example, the BB processor 220 in FIG. 2B, or from firmware operating in a processor, to indicate the start of operations that determine the propagation channel estimates and/or the channel weight to apply to the mixer 408. The delay block 416 may comprise suitable logic, circuitry, and/or code that may be adapted to provide a time delay to compensate for the RF/modem delay. The delay may be applied in order to compensate for the interval of time that may occur between receiving the combined channel estimates, $\hat{h}_1$ and $\hat{h}_2$, modified by the rotation waveform and the actual rotating waveform at the mixer 408.

The SWG channel estimator 418 may comprise suitable logic, circuitry, and/or code that may be adapted to process the first and second baseband combined channel estimates, $\hat{h}_1$ and $\hat{h}_2$, and determine the matrix $\hat{H}_{2 \times 2}$ of propagation channel estimates $\hat{h}_{11}$, $\hat{h}_{12}$, $\hat{h}_{21}$, and $\hat{h}_{22}$. The SWG channel estimator 418 may also be adapted to generate an algorithm start signal to the SWG algorithm block 420 to indicate that the propagation channel estimates $\hat{h}_{11}$, $\hat{h}_{12}$, $\hat{h}_{21}$, and $\hat{h}_{22}$ are available for processing. In this regard, the algorithm start signal may be asserted when integration operations performed by the SWG channel estimator 418 have completed.

The SWG algorithm block 420 may comprise suitable logic, circuitry, and/or code that may be adapted to determine a channel weight to be transferred to the mixer 408 via the RF phase and amplitude controller 412 to modify the signal $s_{R2}$. The channel weight to be transferred to the mixer 408 may refer to the phase, $\phi$, and amplitude, A. The channel weight may be based on the propagation channel estimates $\hat{h}_{11}$, $\hat{h}_{12}$, $\hat{h}_{21}$, and $\hat{h}_{22}$ and on additional information such as noise power estimates and interference propagation channel estimates, for example. The SWG algorithm block 420 may also be adapted to generate an algorithm end signal to indicate to the RF phase and amplitude controller 412 that the channel weight has been determined and that it may be applied to the mixer 408. The SWG algorithm block 420 in FIG. 4A may also be adapted to determine the feedback information that may be transferred to the transmitter 226 in FIG. 2A. The feedback information may be calculated jointly to maximize the receiver SINR, for example.

The RF phase and amplitude controller 412 may comprise suitable logic, circuitry, and/or code that may be adapted to apply the rotation waveform $e^{jw_r t}$ to the mixer 408. When phase and amplitude components, A and $\phi$, that correspond to the channel weight determined by the SWG algorithm block 420 are available, the RF phase and amplitude controller 412 may apply amplitude A and phase φ to the mixer 408. In this regard, the RF phase and amplitude controller 412 may apply the rotation waveform or the amplitude and phase components in accordance with the control signals provided by the phase rotator start controller 414 and/or the algorithm end signal generated by the SWG algorithm block 420.

The phase rotation operation performed on the $s_{R2}$ signal in the additional receive antenna Rx_2 404 may be continuous or periodic. A continuous rotation of the $s_{R2}$ signal may be perceived by a wireless modem as a high Doppler, and for some modem implementations this may decrease the modem's performance. When a periodic rotation operation is utilized instead, the period between consecutive phase rotations may depend on the Doppler frequency perceived by the wireless modem. For example, in a higher Doppler operation, it may be necessary to perform more frequent channel estimation while in a lower Doppler operation, channel estimation may be less frequent. The signal rotation period may also depend on the desired wireless modem performance and the accuracy of the propagation channel estimation. For example, when the Doppler frequency is 5 Hz, the period between consecutive rotations may be ⅟₅₀ sec., that is, 10 rotations or channel estimations per signal fade.

Figure 4B:
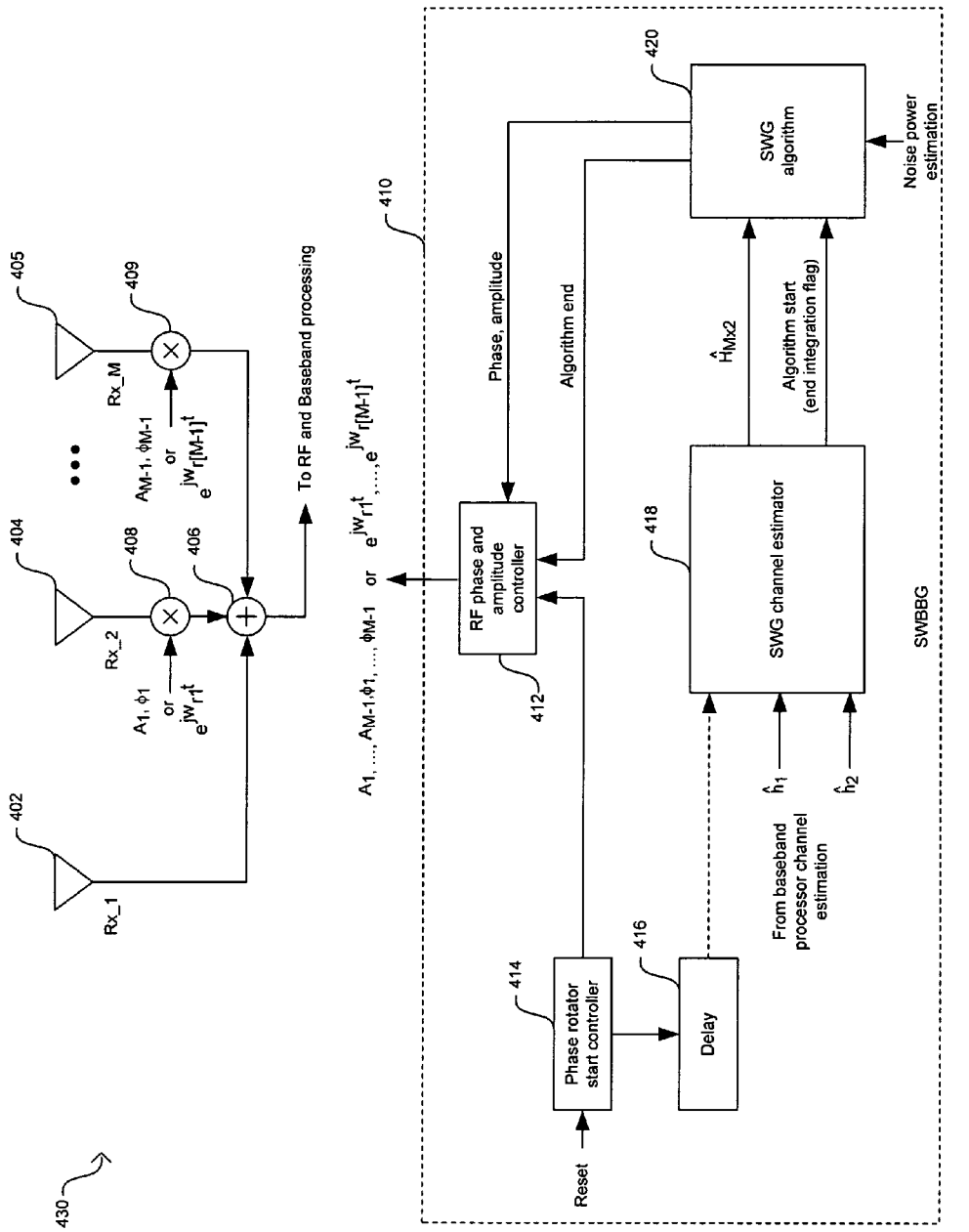
FIG. 4B is a block diagram of an exemplary single weight baseband generator (SWBBG) that may be utilized in a 2-Tx and M-Rx antennas system, in accordance with an embodiment of the invention.

FIG. 4B is a block diagram of an exemplary single weight baseband generator (SWBBG) that may be utilized in a 2-Tx and M-Rx antennas system, in accordance with an embodiment of the invention. Referring to FIG. 4B, a receiver system 430 may differ from the receiver system 400 in FIG. 4A in that (M-1) additional receive antennas, Rx_2 404 to Rx_M 405, and (M-1) mixers 408 to 409 may be utilized. In this regard, the SWG channel estimator 418 may be adapted to process the first and second baseband combined channel estimates, $\hat{h}_1$ and $\hat{h}_2$, and determine the matrix $\hat{H}_{M \times 2}$ of propagation channel estimates $\hat{h}_{11}$ to $\hat{h}_{M1}$, and $\hat{h}_{12}$ to $\hat{h}_{M2}$. At least some of the various portions of the receiver system 430 may be implemented in the reconfigurable OFDM block 190 in FIG. 1C to support single weight diversity, for example.

The SWG algorithm block 420 may also be adapted to determine (M-1) channel weights, that may be utilized to maximize receiver SINR, for example, to be applied to the mixers 408 to 409 to modify the portions of the transmitted SC communication signals received by the additional receive antennas Rx_2 404 to Rx_M 405. The (M-1) channel weights may comprise amplitude and phase components, $A_1$ to $A_{M-1}$ and $\phi_1$ to $\phi_{M-1}$. The SWG algorithm block 420 in FIG. 4B may also be adapted to determine the feedback information that may be transferred to the transmitter 226 in FIG. 2A. The channel weights and the feedback information may be calculated jointly to maximize the receiver SINR, for example.

The RF phase and amplitude controller 412 may also be adapted to apply rotation waveforms $e^{jw_{r1}t}$ to $e^{jw_{r(M-1)}t}$ or phase and amplitude components, $A_1$ to $A_{M-1}$ and $\phi_1$ to $\phi_{M-1}$, to the mixers 408 to 409. In this regard, the RF phase and amplitude controller 312 may apply the rotation waveforms or the amplitude and phase components in accordance with the control signals provided by the phase rotator start controller 414 and/or the algorithm end signal generated by the SWG algorithm block 420.

Figure 4C:
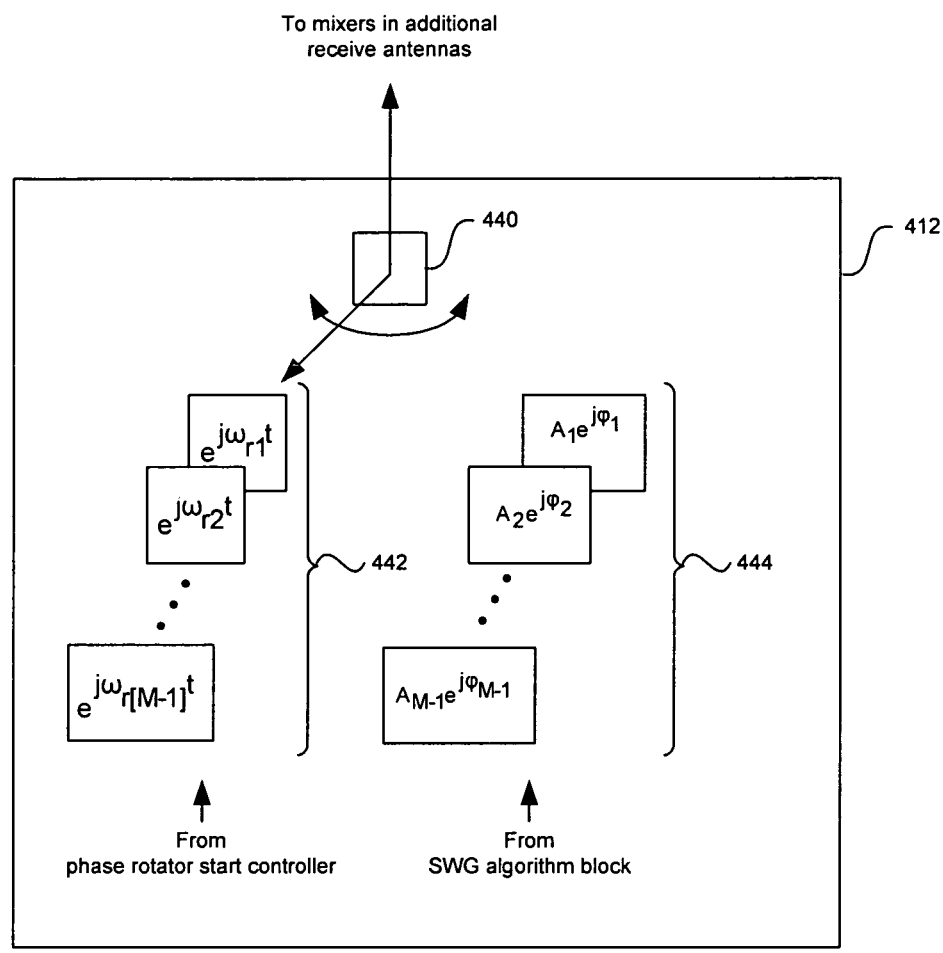
FIG. 4C is a block diagram of an exemplary RF phase and amplitude controller, in accordance with an embodiment of the invention.

FIG. 4C is a block diagram of an exemplary RF phase and amplitude controller, in accordance with an embodiment of the invention. Referring to FIG. 4C, the RF phase and amplitude controller 412 may comprise a switch 440, a plurality of rotation waveform sources 442, and a plurality of SWG algorithm weights 444. The switch 440 may comprise suitable hardware, logic, and/or circuitry that may be adapted to select between the rotation waveforms $e^{jw_{r1}t}$ to $e^{jw_{r(M-1)}t}$ and the SWG algorithm determined weights $A_1 e^{j\phi_1}$ to $A_{M-1} e^{j\phi_{M-1}}$. The rotation waveform sources 442 may comprise suitable hardware, logic, and/or circuitry that may be adapted to generate the signal $e^{jw_{rk}t}$, where $w_{rk}=2\pi f_{rk}$ and $f_{rk}$ is the rotation frequency that preserves the orthogonality of the received signals at the receive antennas Rx_2 402 to Rx_M 405 in FIG. 4B, for example. The rotation frequency that preserves the signal orthogonality at the receiving antennas may be selected as $w_{rk}=kw_r$ where k=1, 2, . . . , M-1. Other rotation waveforms such as triangular or square waveforms may be utilized with the same frequency relationships. Moreover, waveforms representing different orthogonal codes of the same frequency may also be utilized. In this embodiment, the signal $e^{jw_{rk}t}$ may be utilized as an exemplary waveform. The plurality of SWG algorithm weights 344 may comprise suitable hardware, logic, and/or circuitry that may be adapted to generate the signals $A_1 e^{j\phi_1}$ to $A_{M-1} e^{j\phi_{M-1}}$ from the amplitude and phase components, $A_1$ to $A_{M-1}$ and $\phi_1$ to $\phi_{M-1}$, respectively.

In operation, the RF phase and amplitude controller 412 may apply the signals $e^{jw_{r1}t}$ to $e^{jw_{r(M-1)}t}$ to the mixers 408 to 409 in FIG. 4B based on control information provided by the phase rotator start controller 414. The switch 440 may select the rotation waveform sources 442 based on the control information provided by the phase rotator start controller 414. Once the channel weights are determined by the SWG algorithm block 420 and the phase and amplitude components have been transferred to the RF phase and amplitude controller 412, the algorithm end signal may be utilized to change the selection of the switch 440. In this regard, the switch 440 may be utilized to select and apply the signals $A_1 e^{j\phi_1}$ to $A_{M-1} e^{j\phi_{M-1}}$ to the mixers 408 to 409 in FIG. 4B.

Figure 5:
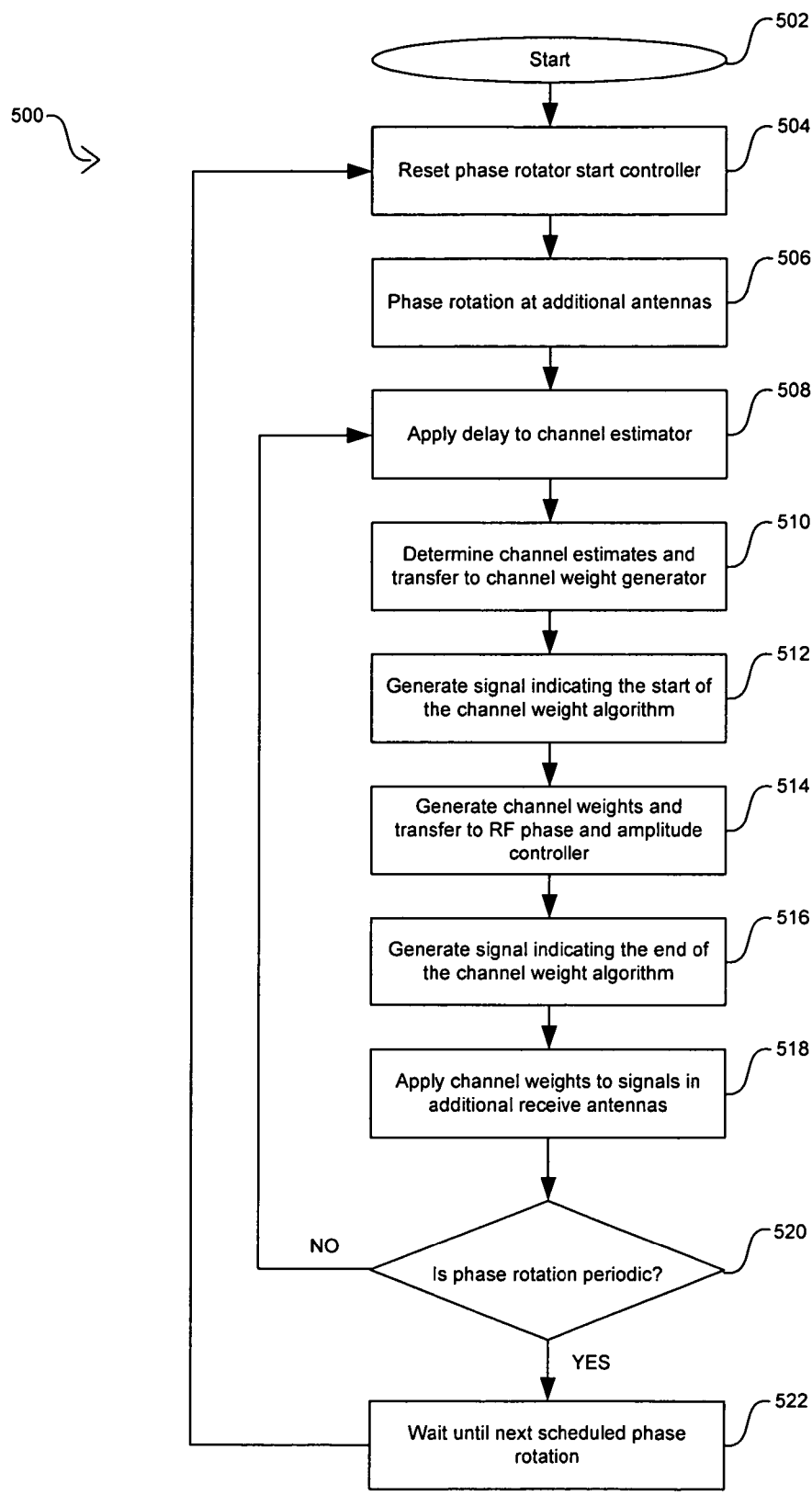
FIG. 5 is a flow diagram illustrating exemplary steps in the operation of the single weight baseband generator (SWBBG) that may be utilized for channel estimation in a 2-Tx and M-Rx antennas system, in accordance with an embodiment of the invention.

FIG. 5 is a flow diagram illustrating exemplary steps in the operation of the single weight baseband generator (SWBBG) that may be utilized for channel weight generation in a 2-Tx and M-Rx antennas system, in accordance with an embodiment of the invention. Referring to FIG. 5, after start step 502, in step 504, the phase rotator start controller 414 in FIG. 4B may receive the reset signal to initiate operations for determining propagation channel estimates and channel weights in the SWBBG 410. The phase rotator start controller 414 may generate control signals to the delay block 416 and to the RF phase and amplitude controller 412. The control signals to the delay block 416 may be utilized to determine a delay time to be applied by the delay block 416. The control signals to the RF phase and amplitude controller 412 may be utilized to determine when to apply the rotation waveforms that have been modified by the channel weights to the mixers 408 to 409.

In step 506, the RF phase and amplitude controller 412 may apply rotation waveforms, such as those provided by the rotation waveform sources 442 in FIG. 4C, to the mixers 408 to 409 in FIG. 4B. In step 508, the delay block 416 may apply a time delay signal to the SWG channel estimator 418 to reflect the interval of time that may occur between receiving the SC communication signals and when the first and second baseband combined channel estimates, $\hat{h}_1$ and $\hat{h}_2$, are available to the SWG channel estimator 418. For example, the time delay signal may be utilized as an enable signal to the SWG channel estimator 418, where the assertion of the time delay signal initiates operations for determining propagation channel estimates. In step 510, the SWG channel estimator 418 may process the first and second baseband combined channel estimates, $\hat{h}_1$ and $\hat{h}_2$, and may determine the matrix $\hat{H}_{M \times 2}$ of propagation channel estimates $\hat{h}_1$ to $\hat{h}_{M1}$, and $\hat{h}_{12}$ to $\hat{h}_{M2}$. The SWG channel estimator 418 may transfer the propagation channel estimates $\hat{h}_{11}$ to $\hat{h}_{M1}$ and $\hat{h}_{12}$ to $\hat{h}_{M2}$ to the SWG algorithm block 420. In step 512, the SWG channel estimator 418 may generate the algorithm start signal and may assert the signal to indicate to the SWG algorithm block 420 that it may initiate operations for determining channel weights.

In step 514, the SWG algorithm block 420 may determine the channel weights comprising phase and amplitude components, $A_1$ to $A_{M-1}$ and $\phi_1$ to $\phi_{M-1}$, based on the propagation channel estimates $\hat{h}_{11}$ to $\hat{h}_{M1}$ and $\hat{h}_{12}$ to $\hat{h}_{M2}$ and/or noise power estimates, for example. The SWG algorithm block 420 may transfer the channel weights to the RF phase and amplitude controller 412. In some instances, the SWG algorithm block 420 may also generate feedback information. In step 516, the SWG algorithm block 420 may generate the algorithm end signal to indicate to the RF phase and amplitude controller 412 that the channel weights are available to be applied to the mixers 408 to 409. In step 518, the RF phase and amplitude controller 412 may apply the rotation waveforms with phase and amplitude components, $A_1$ to $A_{M-1}$ and $\phi_1$ to $\phi_{M-1}$, to the mixers 408 to 409, in accordance with the control signals provided by the phase rotator start controller 414.

In step 520, the receiver system 430 in FIG. 4B may determine whether the phase rotation operation on the received SC communication signals is periodic. When the phase rotation operation is not periodic but continuous, the process may proceed to step 508 where a delay may be applied to the SWG channel estimator 418. In instances when the phase rotation operation is periodic, the process may proceed to step 522 where the receiver system 430 may wait until the next phase rotation operation is initiated by the reset signal. In this regard, the process control may proceed to step 504 upon assertion of the reset signal to the phase rotator start controller 414.

Figure 6:
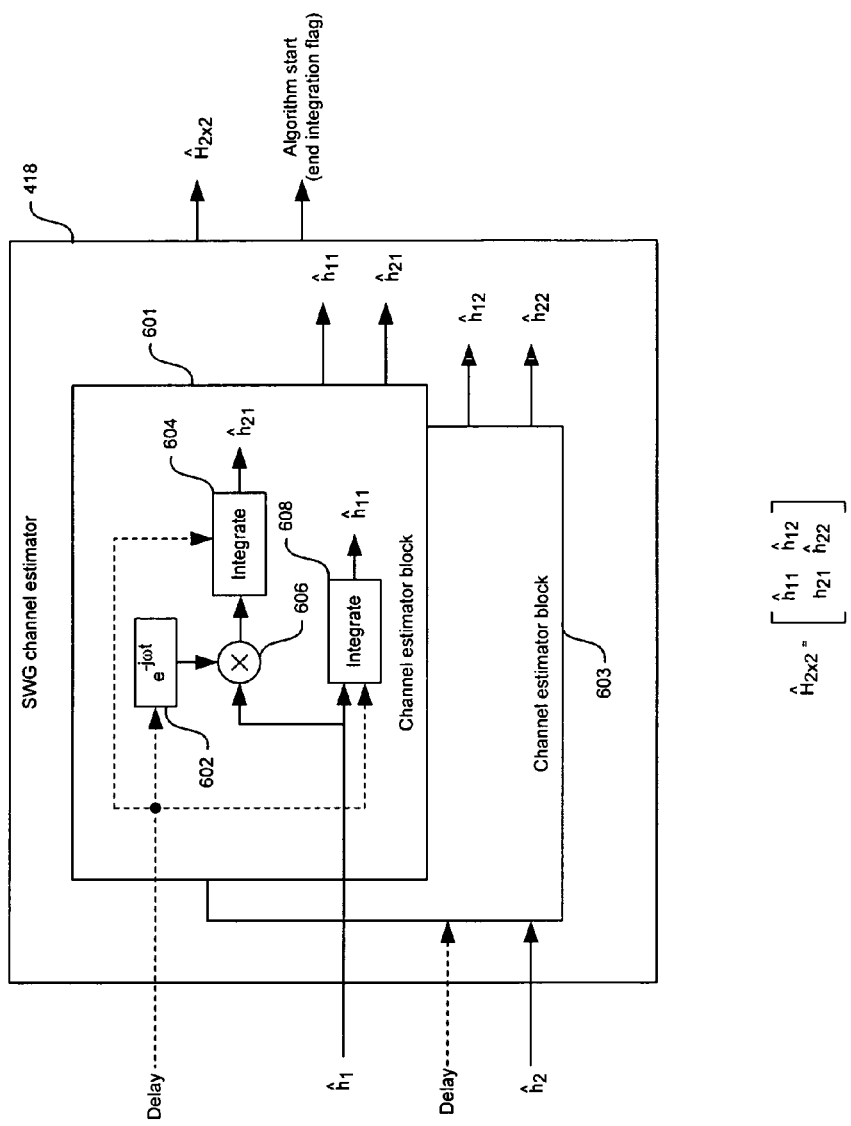
FIG. 6 is a block diagram of an exemplary channel estimator for a 2-Tx and 2-Rx antennas system, in accordance with an embodiment of the invention.

FIG. 6 is a block diagram of an exemplary channel estimator for a 2-Tx and 2-Rx antennas system, in accordance with an embodiment of the invention. Referring to FIG. 6, the SWG channel estimator 418 in FIG. 4A utilized in, for example, a 2-Tx and 2-Rx antenna system may comprise a first channel estimator block 601 and a second channel estimator block 603. The first channel estimator block 601 may comprise a phase rotator 602, a mixer 606, a first integrator 604, and a second integrator 608. The second channel estimator block 603 may also comprise a phase rotator 602, a mixer 606, a first integrator 604, and a second integrator 608. The phase rotator 602 may comprise suitable logic, circuitry, and/or code that may be adapted to generate a complex conjugate of the rotation waveform $e^{jw_rt}$. The first integrator 604 and the second integrator 608 may comprise suitable logic, circuitry, and/or code that may be adapted to integrate an input signal over a 360-degree phase rotation period.

The accuracy and/or time of the integration may vary and may be selected by the SWGGB 410 in FIG. 4A. The mixer 606 may comprise suitable logic and/or circuitry that may be adapted to multiply the rotation waveform complex conjugate and a baseband combined channel estimate. For example, the mixer 606 in the first channel estimator block 601 and the mixer 606 in the second channel estimator block 603 may multiply, respectively, the first and second baseband combined channel estimates, $\hat{h}_1$ and $\hat{h}_2$, where $\hat{h}_1=\hat{h}_{11}+e^{jw_rt}\hat{h}_{21}$ and $\hat{h}_2=\hat{h}_{12}+e^{jw_rt}\hat{h}_{22}$, with the rotation waveform complex conjugate.

In operation, the delay signal from the delay block 416 may indicate to the phase rotator 602, the first integrator 604, and/or the second integrator 608 when to start operations for determining the propagation channel estimates. After the delay signal is asserted, the second integrator 608 may receive the baseband combined channel estimate and may integrate the baseband combined channel estimate over a 360-degree phase rotation period. The integration time may be selected based on channel estimation accuracy and required modem performance. A longer integration time may result in more accurate channel estimates. The second integrator 608 in the first channel estimator block 601 and the second integrator 608 in the second channel estimator block 603 may determine, respectively, the propagation channel estimates $\hat{h}_{11}$ and $\hat{h}_{12}$ by determining the expectation values of $\hat{h}_1$ and $\hat{h}_2$ as follows:

$$\hat{h}_{11}=E[\hat{h}_{11}+e^{jw_rt}\hat{h}_{21}]=\hat{h}_{11}+E[e^{jw_rt}\hat{h}_{21}], \text{ and}$$

$$\hat{h}_{12}=E[\hat{h}_{12}+e^{jw_rt}\hat{h}_{22}]=\hat{h}_{12}+E[e^{jw_rt}\hat{h}_{22}],$$

where $E[e^{jw_rt}\hat{h}_{21}]$ and $E[e^{jw_rt}\hat{h}_{22}]$ over a full 360-degree rotation period are equal to zero. In this regard, channel estimates $\hat{h}_{11}$ and $\hat{h}_{12}$ may referred to as first channel estimates because they correspond to propagation channels related to a first transmit antenna.

After the delay signal is asserted, the first integrator 604 in the first channel estimator block 601 and the first integrator 604 in the second channel estimator block 603 may receive, respectively, the signals $e^{-jw_rt}\hat{h}_1$ and $e^{-jw_rt}\hat{h}_2$. The first integrator 604 in the first channel estimator block 601 and the first integrator 604 in the second channel estimator block 603 may determine, respectively, the channel estimates $\hat{h}_{21}$ and $\hat{h}_{22}$ by determining the expectation values of $e^{-jw_rt}\hat{h}_1$ and $e^{-jw_rt}\hat{h}_2$ as follows:

$$\hat{h}_{21}=E[e^{-jw_rt}\hat{h}_1]=E[e^{-jw_rt}(\hat{h}_{11}+e^{jw_rt}\hat{h}_{21})]=E[e^{-jw_rt}\hat{h}_{11}+\hat{h}_{21}]=E[e^{jw_rt}\hat{h}_{11}]+\hat{h}_{21},$$

and $$\hat{h}_{22}=E[e^{-jw_rt}\hat{h}_2]=E[e^{-jw_rt}(\hat{h}_{12}+e^{jw_rt}\hat{h}_{22})]=E[e^{-jw_rt}\hat{h}_{12}+\hat{h}_{22}]=E[e^{-jw_rt}\hat{h}_{12}]+\hat{h}_{22}$$

where $E[e^{-jw_rt}\hat{h}_{11}]$ and $E[e^{-jw_rt}\hat{h}_{12}]$ over a full 360-degree rotation period is equal to zero. In this regard, channel estimates $\hat{h}_{21}$ and $\hat{h}_{22}$ may referred to as second channel estimates because they correspond to propagation channels related to a second transmit antenna.

The channel estimation operations performed by the SWG channel estimator 418 may be extended to cases where M receive antennas result in a first and second baseband combined channel estimates, $\hat{h}_1$ and $\hat{h}_2$, which comprise information regarding propagation channels $h_{11}$ to $h_{M1}$ and $h_2$ to $h_{M2}$. In that case, a plurality of channel estimator blocks may be utilized to determine the matrix $\hat{H}_{M\times2}$ of propagation channel estimates $\hat{h}_{11}$ to $\hat{h}_{M1}$ and $\hat{h}_{12}$ to $\hat{h}_{M2}$.

Figure 7:
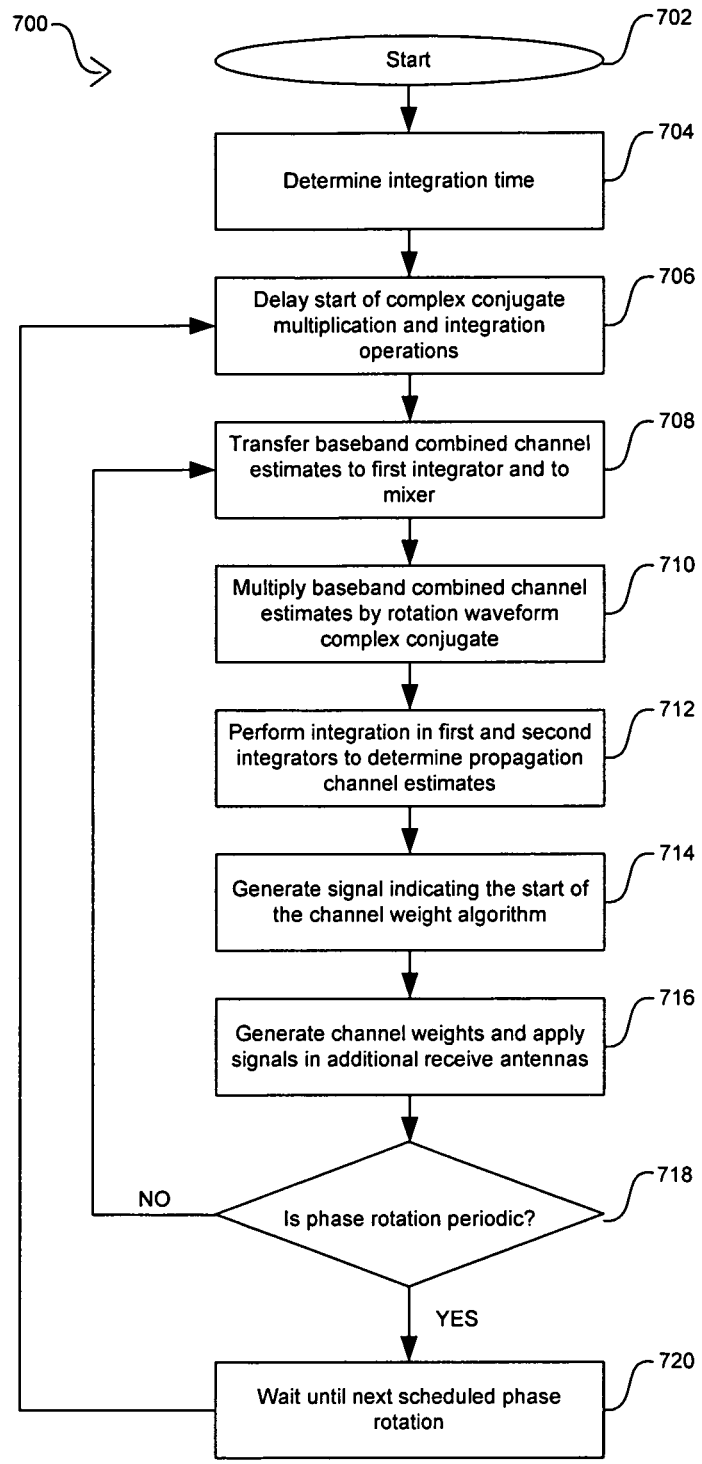
FIG. 7 is a flow diagram illustrating exemplary steps for channel estimation based on complex multiplication and integration of a first and second baseband combined channel estimates, in accordance with an embodiment of the invention.

FIG. 7 is a flow diagram illustrating exemplary steps for channel estimation based on complex multiplication and integration of a first and second baseband combined channel estimates, in accordance with an embodiment of the invention. Referring to FIG. 7, after start step 702, in step 704, the integration time and/or integration resolution may be selected for the first and second integrators in FIG. 6. For example, the SWBBG 221 in FIG. 2A may select the integration time. In step 706, the delay signal may be asserted to initiate the operations performed by the phase rotator 602, the first integrator 604, and the second integrator 608. The phase rotator 602 may generate a complex conjugate of the rotation waveform $e^{jw_rt}$. In step 708, the first and second baseband combined channel estimates, $\hat{h}_1$ and $\hat{h}_2$, may be transferred to the second integrator 608 and to the mixer 606 for processing. In step 710, the baseband combined channel estimates, $\hat{h}_1$ and $\hat{h}_2$, may be multiplied by the complex conjugate of the rotation waveform $e^{jw_rt}$.

In step 712, integration over a 360-degree phase rotation period may be performed in the first integrator 604 and the second integrator 608 to determine propagation channel estimates $\hat{h}_{21}$ and $\hat{h}_{22}$ and $\hat{h}_{11}$ and $\hat{h}_2$ respectively. In step 714, after the propagation channel estimates have been determined, the SWG channel estimator 418 in FIG. 4A may generate the algorithm start signal to indicate to the SWG algorithm block 420 that the propagation channel estimates are available. The SWG algorithm block 420 may start operations for determining channel weights when the algorithm start signal is asserted. In step 716, the SWG algorithm block 420 may generate channel weights based on the propagation channel estimates. The channel weights may be applied to the additional or second receive antenna.

In step 718, the receiver system 400 in FIG. 4A may determine whether the phase rotation operation on the received SC communication signals is periodic. When the phase rotation is not periodic but continuous, control may proceed to step 708 where the next set of first and second baseband combined channel estimates, $\hat{h}_1$ and $\hat{h}_2$, from the BB processor 220 in FIG. 2A may be available for channel estimation. When the phase rotation is periodic, control may proceed to step 720 where the SWG channel estimator 418 may wait until the delay signal is asserted to initiate the operations performed by the phase rotator 602, the first integrator 604, and the second integrator 608. In this regard, control may proceed to step 706 upon the assertion of the reset signal to the phase rotator start controller 414 and the generation of the control signals to the delay block 416.

The channel estimation operations described in FIG. 7 may be extended to cases where M receive antennas result in a first and second baseband combined channel estimates, $\hat{h}_1$ and $\hat{h}_2$, which comprise information regarding propagation channels $h_{11}$ to $h_{M1}$ and $h_{12}$ to $h_{M2}$. In that case, a plurality of channel estimator blocks may be utilized to determine the matrix $\hat{H}_{M \times 2}$ of propagation channel estimates $\hat{h}_{11}$ to $\hat{h}_{M1}$, and $\hat{h}_{12}$ to $\hat{h}_{M2}$.

In an embodiment of the invention, a machine-readable storage may be provided, having stored thereon, a computer program having at least one code section executable by a machine, thereby causing the machine to perform the steps for achieving single weight diversity in a reconfigurable orthogonal frequency division multiplexing (OFDM) chip.

Certain aspects of the invention may correspond to a system for handling wireless communication, the system comprising circuitry within a single chip that applies at least one of a plurality of channel weights generated within the single chip to at least one of a plurality of signals received via a plurality of antennas in a single orthogonal frequency division multiplexing (OFDM) receiver. One of the signals received may be utilized as a reference signal. Circuitry within the single chip may be adapted to combine the signals received via the antennas to generate a single combined received signal. Circuitry within the single chip may also be adapted to determine a plurality of channel estimates based on the combined plurality of signals. Circuitry within the single chip may also be adapted to determine at least one of a plurality of subsequent channel weights based on the determined channel estimates.

The system may also comprise a processor coupled to the single chip, wherein the processor may be adapted to select an integration time for determining the channel estimates, for example. The processor may also be adapted to configure the single chip in the OFDM receiver to handle at least one of a plurality of communication protocols based on OFDM. These communication protocols may comprise an IEEE 802.11 wireless local area network (WLAN) protocol, an IEEE 802.16 wireless metropolitan area network (WMAN) protocol, or a digital video broadcasting (DVB) protocol, for example. Circuitry within the single chip may be adapted to update at least a portion of the channel weights dynamically. Moreover, circuitry within the single chip may be adapted to determine a phase and amplitude component for at least one of the channel weights.

The approach described herein for a reconfigurable OFDM chip supporting single weight diversity may result in higher transmission rates for various communication standards such as WLAN, WMAN, and/or DVB-H, for example. Moreover, the collaborative architecture provided may be utilized in wireless devices to support efficient cellular and OFDM-based communication.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for handling wireless communication, the method comprising:
   in an orthogonal frequency division multiplexing (OFDM) receiver:
      selecting at least one of a plurality of generated rotation waveforms and at least one of a plurality of generated channel weights, wherein:
         said plurality of rotation waveforms are generated to preserve an orthogonality of a plurality of signals received at a plurality of receive antennas, and
         said plurality of channel weights are generated to maximize a signal to interference and noise ratio of said receiver; and
      modifying at least one of said plurality of signals received at said plurality of receive antennas based on said selection.

2. The method according to claim 1, comprising combining said plurality of signals received at said plurality of receive antennas to generate a single combined received signal.

3. The method according to claim 2, comprising determining a plurality of baseband combined channel estimates based on said generated single combined received signal.

4. The method according to claim 3, comprising selecting an integration time for determining said plurality of baseband combined channel estimates.

5. The method according to claim 3, comprising determining at least one of a plurality of subsequent channel weights based on said determined plurality of baseband combined channel estimates.

6. The method according to claim 1, comprising modifying said at least one of said plurality of signals received at said plurality of receive antennas by multiplying a complex conjugate of said selected at least one of said plurality of generated rotation waveforms with a baseband combined channel estimate.

7. The method according to claim 1, comprising configuring said OFDM receiver to handle at least one of a plurality of communication protocols based on OFDM.

8. The method according to claim 7, wherein said at least one of said plurality of communication protocols based on OFDM is an IEEE 802.11 wireless local area network (WLAN) protocol, an IEEE 802.16 wireless metropolitan area network (WMAN) protocol, or a digital video broadcasting (DVB) protocol.

9. The method according to claim 1, comprising dynamically updating at least a portion of at least one of a plurality of channel weights.

10. The method according to claim 1, comprising determining a phase and amplitude component for said at least one of said plurality of channel weights.

11. A system for handling wireless communication, the system comprising:
an orthogonal frequency division multiplexing (OFDM) receiver comprising one or more circuits, said one or more circuits being operable to:
select at least one of a plurality of generated rotation waveforms and at least one of a plurality of generated channel weights, wherein:
said plurality of rotation waveforms are generated to preserve an orthogonality of a plurality of signals received at a plurality of receive antennas, and
said plurality of channel weights are generated to maximize a signal to interference and noise ratio of said receiver; and
modify at least one of said plurality of signals received at said plurality of antennas based on said selection.

12. The system according to claim 11, wherein said one or more circuits are operable to combine said plurality of signals received at said plurality of receive antennas to generate a single combined received signal.

13. The system according to claim 12, wherein said one or more circuits are operable to determine a plurality of baseband combined channel estimates based on said generated single combined received signal.

14. The system according to claim 13, wherein said one or more circuits are operable to select an integration time for determining said plurality of baseband combined channel estimates.

15. The system according to claim 13, wherein said one or more circuits are operable to determine at least one of a plurality of subsequent channel weights based on said determined plurality of baseband combined channel estimates.

16. The system according to claim 11, wherein said one or more circuits are operable to modify said at least one of said plurality of signals received at said plurality of receive antennas by multiplying a complex conjugate of said selected at least one of said plurality of generated rotation waveforms with a baseband combined channel estimate.

17. The system according to claim 11, wherein said one or more circuits are operable to configure said OFDM receiver to handle at least one of a plurality of communication protocols based on OFDM.

18. The system according to claim 17, wherein said at least one of said plurality of communication protocols based on OFDM is an IEEE 802.11 wireless local area network (WLAN) protocol, an IEEE 802.16 wireless metropolitan area network (WMAN) protocol, or a digital video broadcasting (DVB) protocol.

19. The system according to claim 11, wherein said one or more circuits are operable to determine a phase and amplitude component for said at least one of said plurality of channel weights.

* * * * *